(12) United States Patent
Manni

(10) Patent No.: US 8,238,399 B2
(45) Date of Patent: Aug. 7, 2012

(54) HIGH-GAIN DIODE-PUMPED LASER AMPLIFIER

(76) Inventor: Jeffrey G. Manni, Burlington, MA (US)

(*) Notice: Subject to any disclaimer, the term of this patent is extended or adjusted under 35 U.S.C. 154(b) by 0 days.

(21) Appl. No.: 13/159,107

(22) Filed: Jun. 13, 2011

(65) Prior Publication Data

US 2011/0243166 A1 Oct. 6, 2011

Related U.S. Application Data

(62) Division of application No. 12/551,973, filed on Sep. 1, 2009, now Pat. No. 7,961,771.

(51) Int. Cl.
*H01S 3/06* (2006.01)

(52) U.S. Cl. ............... 372/66; 372/70; 372/75; 372/101

(58) Field of Classification Search .............. 372/66, 372/70, 75
See application file for complete search history.

(56) References Cited

U.S. PATENT DOCUMENTS

| 4,642,809 | A  | * | 2/1987 | Petheram | 372/66 |
| 6,587,496 | B1 | * | 7/2003 | Murray et al. | 372/70 |

* cited by examiner

*Primary Examiner* — Dung Nguyen
(74) *Attorney, Agent, or Firm* — Joseph Stecewycz

(57) ABSTRACT

A laser amplifier includes a laser active slab with a source of pump power to amplify an input laser beam, the laser active slab including a block of laser active material having opposed lateral faces defining a wedge lateral dihedral angle, opposed longitudinal faces, and opposed parallel transverse faces, the wedge lateral dihedral angle specified to minimize parasitic amplified spontaneous emission. The source of pump power may be one or more laser diode bars and microlenses producing a gain sheet in the laser active slab. The lateral faces may include optical coatings highly transmitting at a wavelength of the pump power and highly reflecting at a lasing wavelength to provide a folded path for the input laser beam though the gain sheet. The laser amplifier may optionally include one or more external mirrors highly reflecting at the lasing wavelength positioned and oriented to provide one or more additional zig-zag passes through the gain sheet for the input laser beam and to provide a multi-pass-amplified laser beam.

5 Claims, 24 Drawing Sheets

HIGH-GAIN DIODE-PUMPED LASER AMPLIFIER

CROSS-REFERENCE TO RELATED APPLICATION

This application is a divisional of patent application Ser. No. 12/551,973, filed on Sep. 1, 2009 now U.S. Pat. No. 7,961,771.

BACKGROUND OF THE INVENTION

1. Field of Invention

The present invention relates to solid state laser amplifiers pumped by semiconductor laser diodes and, in particular, to a laser amplifier operating using a wedge configured laser active slab to reduce the generation of amplified spontaneous emission within the laser amplifier.

2. Description of the Background Art

It is known in the relevant art to use laser emission from one or more semiconductor diode lasers to pump a solid-state laser medium (i.e., diode pumping). Diode pumping provides for high power solid-state laser devices that are more efficient, more compact, more reliable, and that have better beam quality, than lamp-pumped solid-state lasers of comparable output power. Many new diode-pumped solid-state laser (DPSSL) designs have emerged in recent years due to an increasing array of new solid-state laser materials, and a wider range of diode laser pump wavelengths from which the laser designer can select.

Various types of semiconductor diode lasers have become popular for pumping solid-state lasers. These include discrete single-emitter diode lasers as well as one-dimensional (1-D) diode laser arrays (i.e., diode "bars") in which multiple diode laser emitters are integrated onto a single bar of semiconductor material. Two-dimensional (2-D) laser diode arrays incorporate multiple diode laser bars, packaged one above the other, to create a 2-D array of diode laser emitters. Since the emission of the individual diode emitters produce relatively large beam divergence, packaged diode lasers, diode bars, and 2-D diode arrays may include micro-optics to collimate one or both axes of the spatial emission pattern from each diode emitter. In some applications, it may be desirable to couple diode pump light into one or more optical fibers for delivering pump light to the solid-state laser medium.

Diode-pumped solid-state lasers are conventionally categorized as being either end-pumped or side pumped lasers. In end-pumped laser designs, diode laser radiation used for optical pumping travels substantially parallel to the laser beam being generated, or amplified, in the solid-state gain medium. In side-pumped laser designs, diode laser pump radiation travels substantially perpendicularly, or orthogonal, to the laser beam being generated or amplified. End-pumped DPSSLs are typically very efficient (e.g., slope efficiency may be 50% or more), and exhibit very good $TEM_{00}$ (diffraction-limited) beam quality. End-pumped lasers designs are generally regarded as being limited to generating relatively low average output power levels, due to the possibility of thermal fracture of the solid-state laser medium when diode pump power is increased beyond a specified level. End-pumped DPSSL designs that allow pump light to penetrate deeply into the solid-state medium, and that distribute pump power more uniformly along the entire length of a laser rod or slab, are exceptions, but these lasers often suffer from degraded output beam quality unless certain preventive design measures are implemented.

In contrast, side-pumping methods enable the pumping of solid-state laser media with much higher power levels before thermal fracture occurs, mainly because the diode pump power is distributed over a larger area of the solid-state crystal surface. Historically, side-pumped DPSSL designs have been somewhat less efficient, and have exhibited poorer beam quality, than end-pumped lasers. Although side-pumping of round cross-section laser rods is possible, many side-pumping schemes utilize a rectangular slab of laser active solid-state material, where the laser active slab has an either square or rectangular cross section. Laser active slab geometries may provide for heat removal from the laser medium such that the thermal gradient established by the heat removal occurs primarily in a single direction. This configuration allows a linearly-polarized laser beam to be amplified in the laser active stab, with the polarization of the laser beam either parallel or perpendicular to the thermal gradient, and without objectionable effects due to thermal stress-induced birefringence.

Several diode-side-pumped laser gain module, or amplifier, schemes have emerged in recent years that enable matching of a $TEM_{00}$ laser beam or resonator mode to the optically pumped volume of the solid-state laser medium, as is typically required for efficient operation. For example, Eggleston et al. ["The slab geometry laser—Part I: Theory," *J Quantum Electronics*, vol. 20, pp. 289-301 (1984)] describe a side-pumped zig-zag slab scheme in which the beam being amplified is reflected multiple times, via total internal reflection (TIR), at each of two parallel faces of the slab. Diode pump power is injected into the slab through the same two faces configured for reflecting the amplified beam via TIR. These two surfaces are also used for cooling the slab. A zig-zag path taken by the amplified beam helps to average out, or mitigate, spatial distortion effects on the amplified beam profile that pump-induced and cooling-induced non-uniformities in the slab might otherwise have.

As taught by the Eggleston reference, the same two parallel faces of the laser active slab are used for pumping through, heat removal, and reflecting the amplified beam in the laser active slab. These requirements significantly complicate the design and fabrication of such laser active slab designs. While the use of TIR to establish a zig-zag beam path helps to prevent amplified spontaneous emission (ASE) and parasitic oscillation problems, it also limits the number of reflections, and therefore the single-pass gain length, the designer can achieve along a given length of laser active slab medium.

There is also disclosed in U.S. Pat. No. 5,271,031, issued to Baer, a zig-zag slab design in which diode pump light is injected through the same parallel slab side faces used for guiding an amplified beam along a zig-zag path in a laser active slab. Baer '031 further teaches a high-efficiency, mode-matched, solid-state laser with transverse pumping and cascaded amplifier stages. Thin-film dichroic optical coatings, highly reflecting at the laser wavelength and highly-transmitting at the diode pump wavelength, are disposed on the parallel lateral faces. TIR was not used in establishing a zig-zag beam path through the laser active slab. The slab was cooled through transverse faces (i.e., top and/or bottom surfaces of the laser active slab), and not through the lateral faces used for diode pumping and zig-zag beam reflection.

In the Baer '031 design, a single 1-D array diode bar pump source for pumping through one lateral face, or two diode bars for pumping through both parallel lateral faces, are positioned very close (about 0.45 mm) to the laser active slab so as to minimize divergence of the emitted beams from the individual emitters in the diode bar (i.e., beamlets) before entering the laser active slab medium. This configuration provides for distinct individual beamlets that enter and pump the laser active slab material, and thus produce a corresponding 1-D array of discrete gain regions in the lateral side of the laser active slab. The array of diode-pumped gain regions is in a one-to-one correspondence with the pattern of diode emitters in the diode bar pump source, and has the same spacing (or pitch) between gain regions as the pitch of the diode emitters on the laser bar. That is, for a uniformly spaced array of diode emitters, the array of discrete gain regions in the slab is likewise uniformly spaced with the same pitch.

The apexes of a zig-zag path taken by an amplified beam through the laser active slab are aligned to spatially overlap with all of the diode-pumped gain regions corresponding to the emitter positions of the diode laser bar. With this "tightly folded" configuration, Baer was able to demonstrate a laser amplifier gain as high as 15 dB (i.e., an amplification factor of 32) for a single pass through the laser amplifier, when pumping the laser active slab with a 10 W diode bar. However, using the design taught by Baer '031 presents a challenge in both initially achieving and maintaining the tightly-folded beam alignment with the diode emitters. This complicates practical applications of the Baer '031 design, especially when applied to a moderate- or high-volume production setting. Moreover, unwanted amplified spontaneous emission (ASE), or parasitic oscillation, generated at the lasing wavelength of the laser active medium can build up in the laser active slab between the parallel high-reflection lateral surfaces. This unwanted ASE generation can dramatically reduce amplifier gain unless certain special precautions are taken for prevention of the parasitic oscillations and ASE.

Several methods are described in Baer '031 for preventing parasitic lateral oscillations and ASE. One method involves producing micro-patterned coatings on the parallel faces of the laser active slab, with the coatings having alternating high-reflection (HR) and anti-reflection (AR) coating regions. During operation of the laser amplifier, a zig-zag beam path reflects off the parallel sides of the laser active slab at the HR regions of the coatings. The HR regions have the same pitch along the length of the laser active slab as the diode emitter pitch along the length of the diode bar. An HR region on one of the parallel faces of the laser active slab is directly opposite an AR region on the other parallel face, thereby preventing, in theory, the buildup of lateral parasitic oscillations or ASE across the width of the laser active slab. Another method for suppressing lateral parasitics described in Baer '031 involves coating both parallel surfaces with an HR coating, and then selectively etching away the coating so that an HR region on one of the parallel faces is directly opposite a region on the other parallel face in which the HR coating has been etched away. Such micro-patterned coatings are difficult and expensive to fabricate, and may not be considered practical for production in moderate or high volume applications.

A third method for suppressing lateral parasitics, described in Baer '031, is to "slightly wedge" the two nominally parallel faces. The reference does not quantify the magnitude of the wedge angle except to state that, if the wedge angle is too large, then a diode bar with non-uniform spacing between the diode emitters is needed to maintain mode matching between diode emitter positions and apex positions of the zig-zag beam path. This is because the reflecting surfaces would no longer be parallel, and the apex points of the zig-zag path would therefore be spaced non-uniformly along the length of the laser active slab. In a scientific article related to Baer '031, [Baer T M, et al., "Performance of diode-pumped Nd:YAG and Nd:YLF lasers in a tightly folded resonator configuration," *J Quantum Electronics*, vol. 28, pp. 1131-1139 (1992)], a wedge angle of 0.6 milliradians (i.e., 0.035 degrees or 2 arc-minutes) was mentioned as "probably" adequate to suppress lateral parasitics, but small enough to maintain mode matching at uniformly spaced diode emitter positions. However, it has been demonstrated that the 0.6 milliradian lateral wedge angle cited in Baer '031 is not adequate to suppress lateral parasitics and ASE when pumping Nd-doped 1064-nm laser slabs with high power levels of 40 W or more.

The shortcomings of the design taught by Baer '031 are also noted in U.S. Pat. No. 5,651,021 issued to Richard et al. Richard et al. '021 observe that, in the tightly folded design taught by Baer '031, "the maximum power Obtainable from the design is limited by super-radiance (ASE) occurring between the parallel opposite reflective coatings. Furthermore, the multiple-pass optical path is quite complicated due to the requirement to match the reflection points to the active areas of the laser diode".

Richard et al, '021 disclose a diode-side-pumped zig-zag slab laser design that employs a five-sided slab. In this design, total internal reflection (TIR) is used to guide the beam or mode being amplified along a zig-zag path that makes two passes along the length of the laser active slab. The laser active slab is diode-pumped through the two longest (and parallel) sides of the laser active slab, which also reflect the zig-zag beam path. A third side of the laser active slab, oriented perpendicularly to the two parallel long sides, provides another TIR reflection that sends the beam back through the laser active slab for a second zig-zag pass, reflecting again from the parallel lateral sides. Two Brewster-angle faces at one end of the laser active slab provide entrance and exit facets for the laser beam or mode being amplified. An overall two-pass, or round trip, gain length of about 76 mm is achieved with a laser active slab that is about 15 mm long and 3 mm wide, according to a related paper by Richard and McInnes ["Versatile, efficient, diode-pumped miniature slab laser," *Optics Letters*. vol. 20, pp. 371-373 (1995)].

The slab in the design disclosed in Richard et al. '021 is relatively easy and inexpensive to fabricate because it has no coated or curved surfaces. Lateral parasitic oscillation and ASE are prevented by virtue of using TIR to create the zig-zag beam path through the laser active slab. Although a 76 mm of round trip gain length for a 3 mm wide by 15 mm long laser active slab is advantageous, such gain length may be substantially shorter than what can be achieved if, for example, high-reflection coatings and steeper incidence angles at the reflecting faces are used to confine the two-pass zig-zag beam path in the laser active slab.

U.S. Pat. No. 5,774,489 issued to Moulton et al. discloses a diode-side-pumped laser active slab amplifier in which the beam being amplified enters and exits through the longitudinal end faces of the laser active slab. The beam being amplified does not reflect off the lateral side surfaces through which diode pump light is injected. Rather, the amplified beam is directed with mirrors, positioned at the longitudinal ends of the laser active slab, to make multiple zig-zag passes through the laser active slab along its greatest dimension. The end mirrors used to achieve the zig-zag beam configuration may be external mirrors, or, alternatively, end mirrors may be coated directly onto a portion of each end face of the laser active slab, leaving window sections on end faces for the amplified beam to enter and exit.

As taught by Moulton et al. '489, longitudinal parasitic oscillations or ASE can build up between the nominally parallel end mirror surfaces used to achieve the zig-zag beam configuration. Furthermore, this and other gain module designs in which the amplified beam enters and exits the laser active slab at the end faces are difficult to multiple-pass without using a Faraday rotator. Also, because of the multiple segmented coatings that may be required, the laser active slab design taught by Moulton et al. '489 can be difficult and expensive to fabricate, especially if the end mirrors used for creating the zig-zag beam path are coated directly onto the slab end faces.

It can be appreciated by one skilled in the relevant art that most prior art devices that use a zig-zag slab laser design employ total internal reflection (TIR) at parallel side faces to establish a zig-zag beam path through the laser active slab. Because the internal angle of incidence of the zig-zag beam path at the reflecting surfaces must be larger than a specified minimum angle, a TIR design limits the overall length of the zig-zag beam path and, therefore, the laser gain-per-pass that can be achieved in the gain module or amplifier. Designs that employ thin-film coatings to establish a zig-zag path through the laser slab enable steeper angles of incidence, more reflections, longer zig-zag path lengths and, therefore, potentially higher amplifier gain-per-pass, but only if build up of unwanted parasitic oscillations and amplified spontaneous emission (ASE) are prevented. It does not appear that prior art devices employing thin-film coatings to establish a zig-zag beam path have successfully dealt with the problem of unwanted parasitics and ASE. In addition, for some prior art laser amplifier devices using a two-pass amplifier configuration to increase overall gain, especially for devices that employ thin-film coatings, a Faraday isolator or rotator device must be included to separate the input and two-pass output beams. Furthermore, achieving three or four zig-zag passes in such thin-film-coated slabs has often not been possible or practical.

SUMMARY OF THE INVENTION

The disclosed apparatus and method utilize a laser active slab with a source of pump power to amplify an input laser beam, where the laser active slab includes a block of laser active material having opposed lateral faces defining a wedge lateral dihedral angle, opposed longitudinal faces, and opposed parallel transverse faces. The wedge lateral dihedral angle may be selected so as to minimize parasitic amplified spontaneous emission in the laser active slab. The lateral faces may include optical coatings highly transmitting at a wavelength of the pump power and highly reflecting at a lasing wavelength. The source of pump power may be one or more laser diode bars and microlenses producing a gain sheet in the laser active slab. The apparatus may include one or more external mirrors highly reflecting at the lasing wavelength positioned and oriented to provide additional zigzag passes through the gain sheet for the input laser beam and thereby providing multi-pass laser amplifiers.

DETAILED DESCRIPTION OF THE INVENTION

Figure 1:
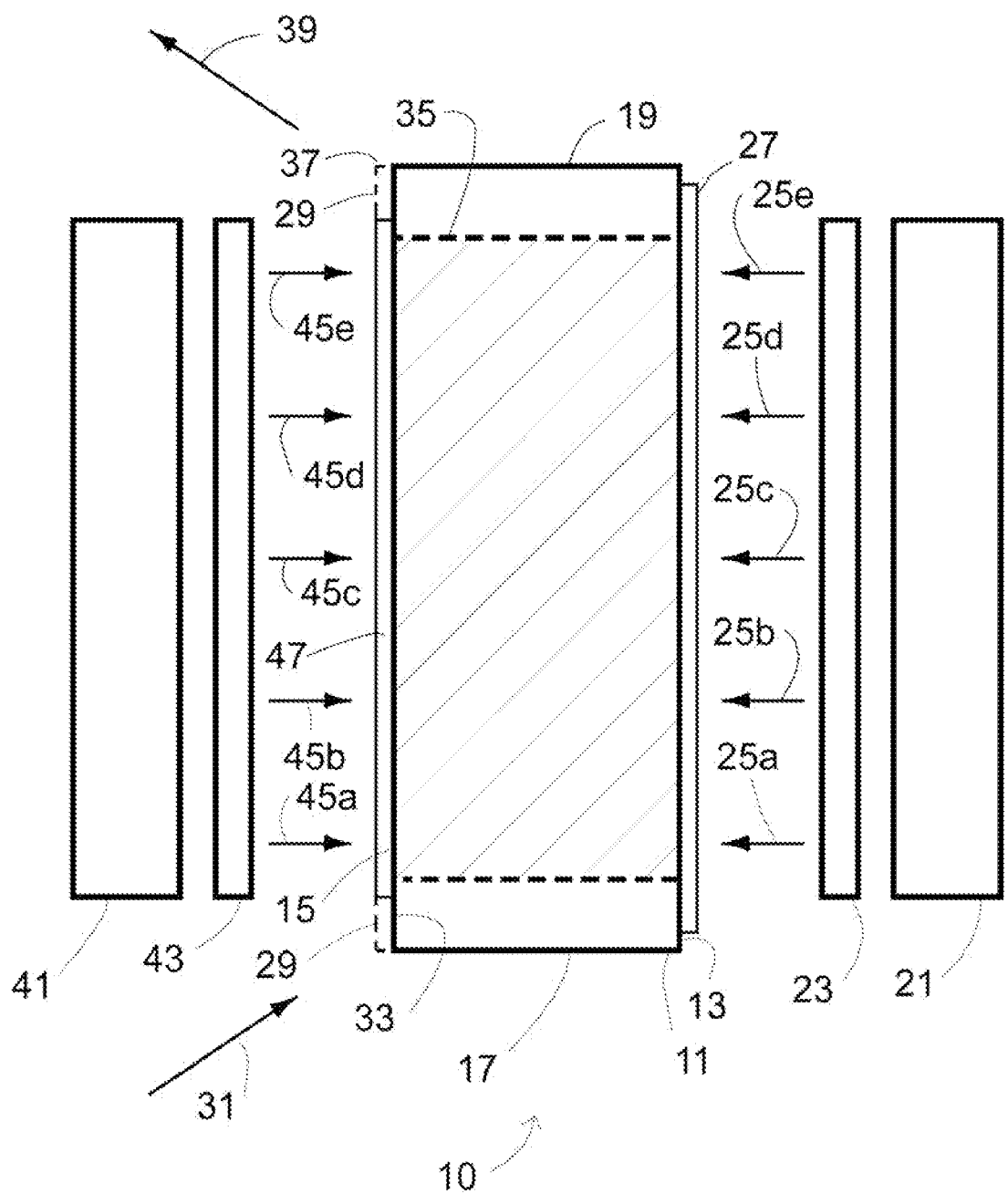
FIG. 1 is a diagrammatical representation of a laser amplifier including an input laser beam, a laser active slab, diode bars, and microlenses, in accordance with the present invention.
Figure 2:
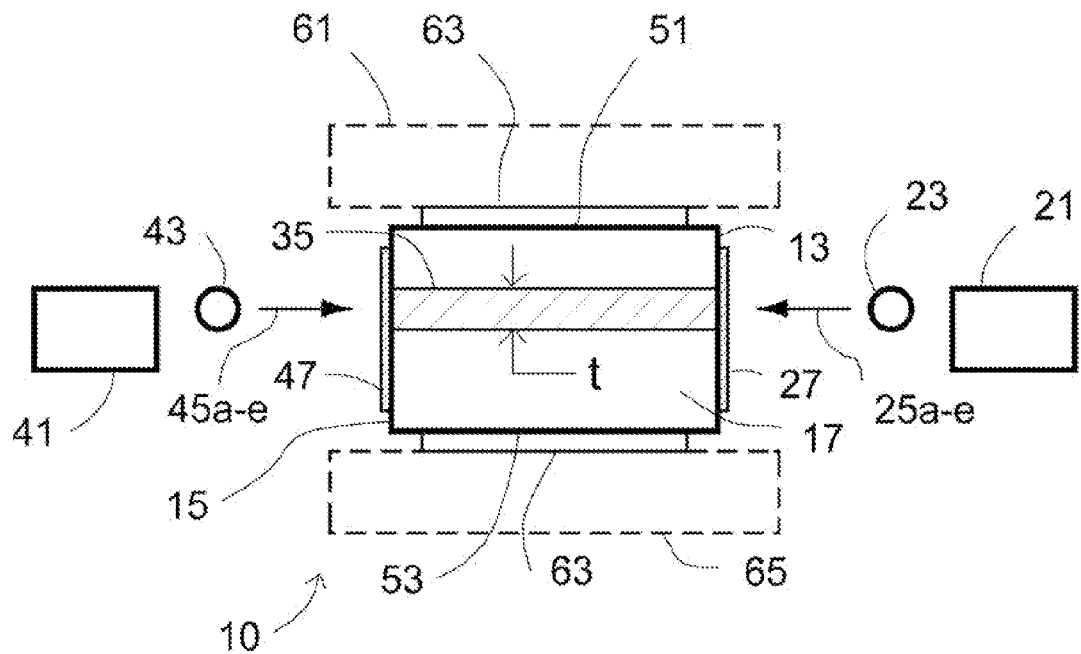
FIG. 2 is an end view of the laser amplifier of FIG. 1 showing cooling surfaces.

There is shown in FIGS. 1 and 2 simplified diagrammatical illustrations of a laser amplifier 10 for an incoming laser beam 31 having a specified lasing wavelength, the laser amplifier 10 including a laser active slab 11, a diode bar 21, and an optional microlens 23. The laser active slab 11 includes a first lateral face 13, a second lateral face 15 opposed to the first lateral face 13, a first longitudinal face 17, and a second longitudinal face 19 opposed to the first longitudinal face 17. The laser active slab 11 may comprise a block of laser active material such as: Nd:YAG, Nd:YLF, Nd:YVO$_4$, INd:GdVO$_4$, Yb:YAG, Yb:YLF, Tm:YAG, Tin:YLF, and Tm:YAlO.

The diode bar 21 comprises a plurality of semiconductor diode lasers (not shown), operating at a pump power wavelength and emitting a respective plurality of radiation beams, as represented by diode emitter beamlets 25a-25e. The laser active slab 11 may include an optical coating 27, such as a thin-film dichroic coating, disposed on the first lateral face 13, highly reflecting at the wavelength of the incoming laser beam 31, and also highly transmitting at the pump power wavelength of the diode emitter beamlets 25a-25e. In one embodiment, the size of the laser active slab 11 may be approximately twelve to twenty millimeters between the first longitudinal face 17 and the second longitudinal ace 19, and three to six millimeters between the first lateral face 13 and the second lateral ace 15.

The laser amplifier 10 functions to amplify the input laser beam 31 which is oriented at a specified angle of incidence and positioned at a specified distance so as to pass through an input window 33 and travel through a gain sheet 35 in the laser active slab 11. The gain sheet 35 is produced by the diode emitter beamlets 25a-25e as explained in greater detail below. The input laser beam 31 passes through the gain sheet 35 and emerges from the laser active slab 11 as an amplified laser beam 39, via an output window 37. The input window 33 and the output window 37 may each include a window anti-reflection coating 29 for the wavelength of the input laser beam 31.

The laser amplifier 10 may further include a second diode bar 41 and a second microlens 43, used in conjunction with the diode bar 21 and the microlens 23, to produce the gain sheet 35. The second diode bar 41 may comprise a plurality of semiconductor diode lasers (not shown), operating at the pump power wavelength and emitting a respective plurality of radiation beams, as represented by secondary diode emitter beamlets 45a-47e. The laser active slab 11 may also include a second optical coating 47 highly reflecting at the wavelength of the input laser beam 31 and disposed on the second lateral face 15. The second optical coating 47 may also be highly transmitting at the wavelength of the secondary diode emitter beamlets 45a-47e.

As best seen in FIG. 2, the laser active slab 11 also includes a first transverse face 51 and an opposed second transverse face 53, where the first transverse face 51 may be substantially parallel to the second transverse face 53. In one embodiment, the size of the laser active slab 11 may be approximately two millimeters between the first transverse face 51 and the second transverse face 53. The laser amplifier 10 may include an optional cooling surface 61, such as a heat sink, maintained in thermal contact with the first transverse face 51 by means of an intervening conductive material 63, such as indium foil, solder, thermally-conductive RTV, or thermally-conductive epoxy, for example. The laser amplifier 10 may also include a second optional cooling surface 65 attached to the second transverse face 53 by the conductive material 63. The cooling surfaces 61 and 63 may comprise, for example, microchannel cooler blocks, finned heat sinks cooled by convection or forced air, or blocks of copper or other thermally-conductive material cooled by water or air. Alternatively, the first transverse face 51 and the second transverse face 53 may be directly cooled by a flow of water or air. For clarity of illustration, the cooling surface 61, the conductive material 63, and the second cooling surface 65 are not shown in FIG. 1, and the incoming laser beam 31 is not shown in FIG. 2.

As can be seen, the diode emitter beamlets 25a-e are incident approximately normal to the first lateral face 13 and the secondary diode emitter beamlets 45a-37e are incident approximately normal to the second lateral face 15. The diode bar 21 and the diode bar 41 may each comprise a one-dimensional laser array bar having an emitter separation pitch ranging from about 0.1 to one millimeter, such as available from Coherent Inc of Santa Clara, Calif. or Cutting Edge Optronics of St. Charles, Mo. The diode bars 21 and 41 may each produce at least twenty to eighty watts of pump power. When present, the microlens 23 may function to collimate the emissions of the diode bar 21 along the fast-axis direction such that the diode emitter beamlets 25a-e have a quasi-collimated divergence of approximately one to three degrees FWHM and a FWHM height of approximately 0.3 to 0.5 mm at the first lateral face 13. With such a configuration, the gain sheet 35 may have a thickness, denoted as 't' in the illustration, of approximately 0.3 to 0.5 mm. The diode emitter beamlets 25a-e may have an uncollimated divergence of approximately ten degrees FWHM along the slow-axis direction. The microlens 23 may comprise a lens such as manufactured by Doric Lenses of Quebec, Canada, LIMO of Dortmund, Germany, and Blue Sky Research of Milpitas, Calif.

The microlens 23 may be positioned from about one to thirty millimeters from the first lateral face 13 so as to provide for an overlapping of adjacent diode emitter beamlets 25a-e at the first lateral face 13. Similarly, the microlens 43 may be positioned from about one to thirty millimeters from the second lateral face 15 wherein the diode emitter beamlets 45a-e have a quasi-collimated fast-axis divergence of approximately one to three degrees FWHM and an uncollimated slow-axis divergence of approximately ten degrees FWHM to provide for overlapping of adjacent diode emitter beamlets 45a-e at the second lateral face 15.

Figure 3:
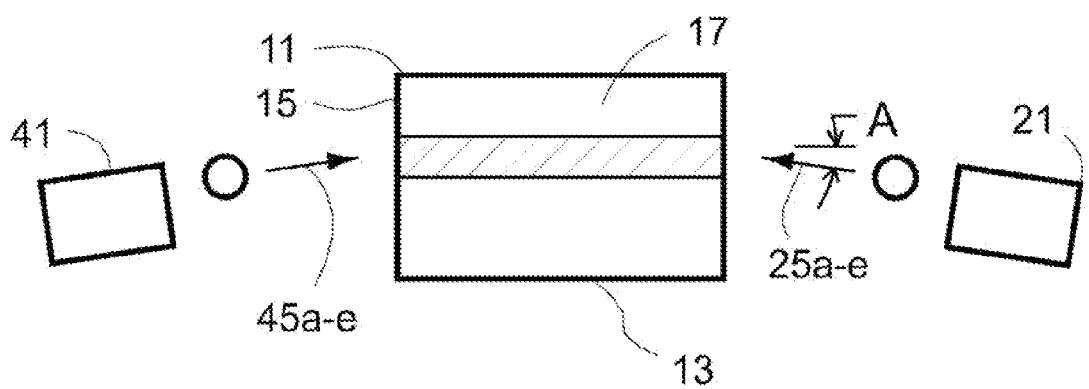
FIG. 3 is an alternate configuration of the laser amplifier of FIG. 1 showing diode bars oriented at an angle at the laser active slab.

In an alternative embodiment, shown in FIG. 3, the diode bar 21 may be oriented at an angle below the normal to the first lateral face 13, here denoted as angle 'A' which may be approximately 1° to 5° as measured in the plane of the first longitudinal face 17. The angle A can be determined as a function of the diameter of diode emitter beamlets 25a-e along the fast axis, the divergence of the diode emitter beamlets 25a-e along the fast axis, the refractive index and width of the medium of the laser active slab 11, and the relative distances between the first lateral face 13, the microlens 23, and the diode bar 21. By thus orienting the diode bar 21, for example, any of the diode emitter beamlets 25a-e passing through the laser active slab 11 and out of the second lateral face 15 are directed away from possibly damaging the second diode bar 41. Similarly, the second diode bar 41 may be oriented at the angle A below the normal to the second lateral face 15, as shown, to avoid causing damage to the diode bar 21. Alternatively, either or both of the diode bar 21 and the second diode bar 41 may be oriented at the angle A above (not shown), rather than below, the normals to the respective lateral faces 13 and 15.

Figure 4:
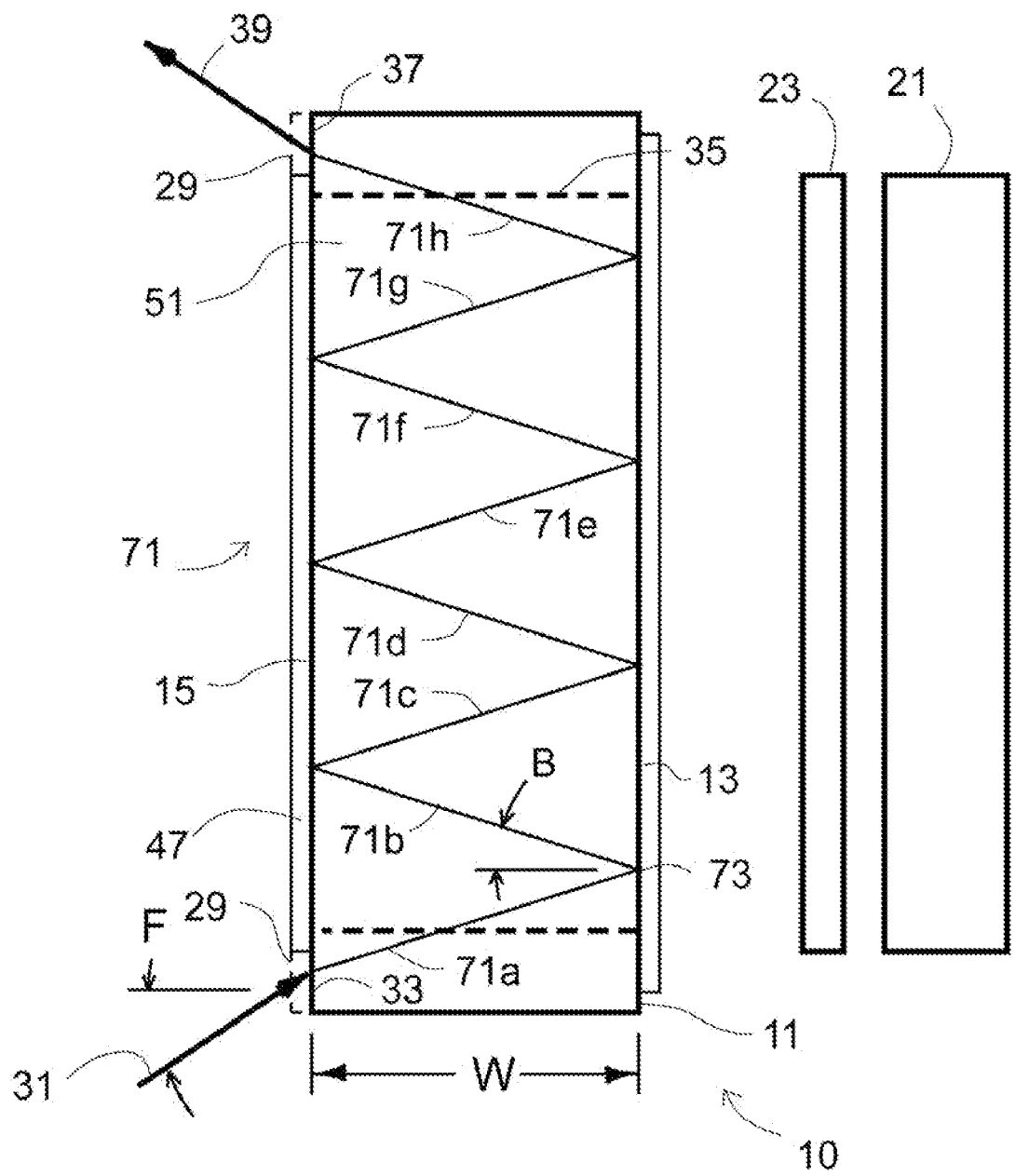
FIG. 4 is a functional diagram of the laser amplifier of FIG. 1 illustrating a single pass operational mode.

The input laser beam 31 is oriented to pass through the gain sheet 35 in the laser active slab 11 and is thus amplified, generally as shown in FIG. 4. For clarity of illustration, the second diode bar 41 and the second microlens 43 are not shown. The input laser beam 31 enters the laser active slab 11 at the input window 33, is refracted at the input window 33, and follows an internal zig-zag path 71, comprising a plurality of path legs 71a-71h, through the gain sheet 35 and bounded by the first lateral face 13 and the second lateral face 15. It can be appreciated by one skilled in the relevant art that the direction of propagation may be in the reverse direction as well, that is, the input laser beam 31 can enter at the output window 37 and exit through the input window 33.

The first lateral face 13 is spaced from the second lateral face 15 by a distance equal to the width of the laser active slab 11, denoted as a dimension 'W.' Accordingly, each path leg 71a-71h is approximately $$\frac{W}{\cos B}$$

in length. Although only eight path legs 71a-71h are shown in the illustration, the input laser beam 31 may make more or fewer passes through the laser active slab, as explained in greater detail below. The optical coatings 27 and 47 may also be highly-reflecting at the wavelength of the input laser beam 31. This configuration provides for reflection of the internal propagating laser radiation at a smaller angle, here denoted by an angle 'B' at a path vertex 73, than would be required if the optical coatings 27 and 47 were not present. Accordingly, in an alternative embodiment, the optical coatings 27 and 47 are not disposed on the respective lateral faces 13 and 15, the input laser beam 31 may be input at a larger injection angle 'F,' and the internal zig-zag path 71 may propagate by means of total internal reflection (TIR) at the lateral faces 13 and 15, as is well-understood in the relevant art.

By following the internal zig-zag path 71, the input laser beam 31 makes multiple passes through the gain sheet 35 and is thereby amplified, as well-known in the relevant art, to emerge at the output window 37 as the amplified laser beam 39. The input laser beam 31 may be a $TEM_{00}$ beam, or a near-$TEM_{00}$ quality beam. The thickness of the gain sheet 35 (see FIG. 2, above) is preferably approximately equal to or slightly greater than the transverse dimension of the input laser beam 31 (i.e., a $1/e^2$ diameter) so as to achieve optimal mode matching, which provides for high gain and efficient extraction of power from the laser amplifier 10.

Figure 5:
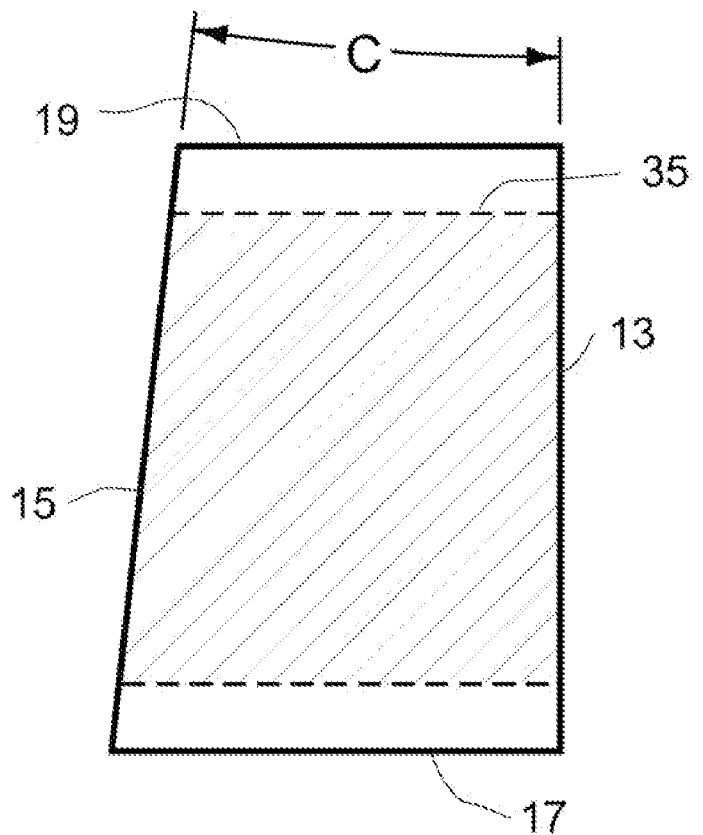
FIG. 5 is a detail diagrammatical view of the laser active slab of FIG. 1 illustrating a lateral dihedral angle feature.
Figure 6:
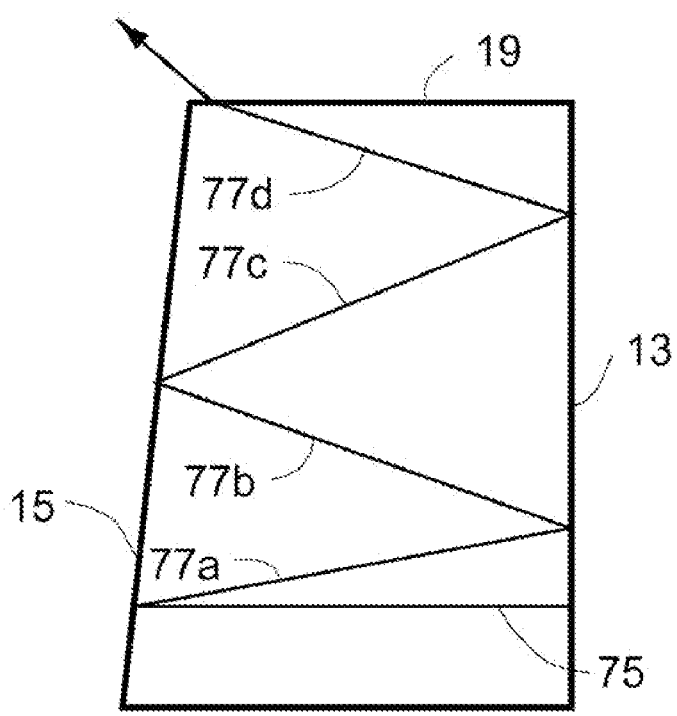
FIG. 6 is a diagrammatical view illustrating removal of parasitic oscillation from the laser active slab of FIG. 5.

FIGS. 5 and 6, which are not drawn to scale, provide diagrammatical illustrations of the geometric configuration of the laser active slab 11 which functions to mitigate parasitic oscillation or parasitic amplified spontaneous emission 75 that might otherwise be generated within the laser active slab 11. For clarity of illustration, the optical coating 27, the window anti-reflection coatings 29, and the second optical coating 47 are not shown. The first lateral face 13 is substantially normal to the first longitudinal face 17 and to the second longitudinal face 19. The second lateral face 15 is oriented to form a wedge lateral dihedral angle 'C' with the first lateral face 13, where the wedge lateral dihedral angle C is at least 0.1°. It should be understood that the wedge lateral dihedral angle C has been exaggerated for clarity of illustration.

This configuration forms an asymmetrical trapezoid prism and thus provides for parasitic amplified spontaneous emission 75, propagating through the gain sheet 35 in generally lateral directions, to 'walk' out of the laser active slab 11 through the second longitudinal face 19 by alternately reflecting from the first lateral face 13 and the second lateral face 15 while migrating to the second longitudinal face 19, as generally represented by parasitic path legs 77a-77d shown in FIG. 6. It should be understood that the illustration has been simplified and that the parasitic amplified spontaneous emission 75 may exhibit a greater number of reflections from the first lateral face 13 and the second lateral face 15 than shown. In general, that the number of such reflections is a function of the dimensions of the laser active slab 11 and of the wedge lateral dihedral angle C. It can be appreciated by one skilled in the relevant art that, because a wedged amplifier functions to minimize parasitic amplified spontaneous emission, twenty to eighty watts or more of pump power can be used to generate the gain sheet in the amplifier without producing the magnitude of thermomechanical stresses present in conventional diode-pumped active slabs.

Figure 7:
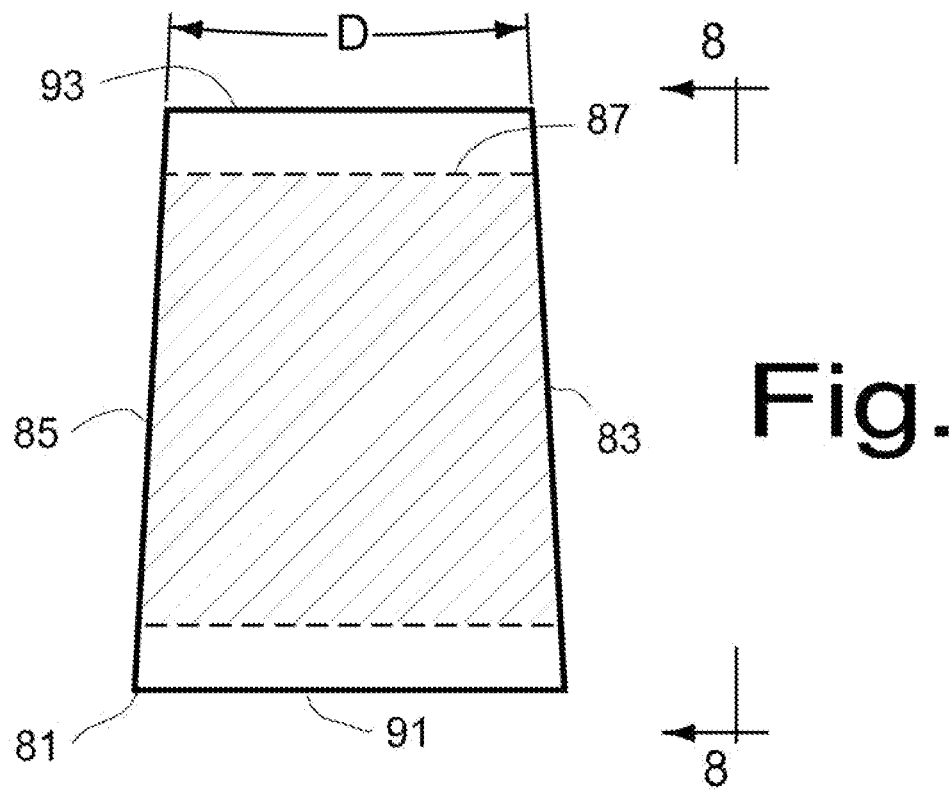
FIG. 7 is a detail diagrammatical view of the laser active slab of FIG. 1 illustrating an alternative lateral dihedral angle feature.

In an alternative embodiment, shown in FIG. 7, a laser active slab 81 comprising a block of the laser active material as described above may be configured as a symmetrical trapezoid prism shown in FIG. 7, which is not drawn to scale. The laser active slab 81 includes a gain sheet 87, and a first longitudinal face 91 which is shown as parallel, in the plane of illustration, to a second longitudinal face 93. However, it should be understood that the first longitudinal face 91 can be angled or counter-wedged (not shown) with respect to the second longitudinal face 93 without impairing the amplified spontaneous emission suppression properties of the laser active slab 81. A first lateral face 83 is oriented to form a wedge lateral dihedral angle 'D' with a second lateral face 85, where the wedge lateral dihedral angle D is nominally 0.5° and is preferably in the range of about $0.1° \leq D \leq$ about $2.0°$. The first lateral face 83 and the second lateral face 85 each form an acute dihedral angle with the first longitudinal face 91.

Figure 8:
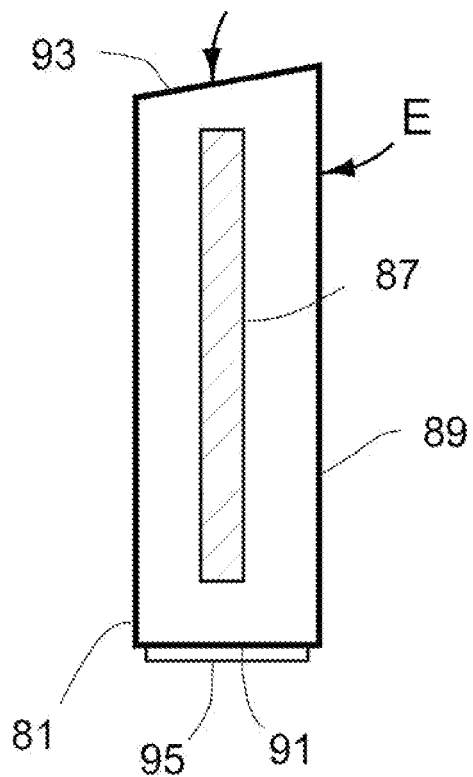
FIG. 8 is a side view of the laser active slab of FIG. 7 showing a gain sheet.

The laser active slab 81 may include one or more additional features, shown in FIG. 8, to mitigate the propagation of amplified spontaneous emission or parasitic radiation through the gain sheet 87 in longitudinal directions. For example, the second longitudinal face 93 may be sloped so as to define an acute dihedral angle 'E' with a transverse face 89 as shown, where $85.0° \leq E \leq 89.9°$. Alternatively, the first longitudinal face 91 may be similarly sloped (not shown) so as to form an acute dihedral angle with the transverse face 89, or the first longitudinal face 91 may be both sloped (not shown) and parallel, or anti-parallel, to the second longitudinal face 95. Additionally, a longitudinal optical coating 95 may be disposed on either or both the first longitudinal face 91 and the second longitudinal face 93 (not shown) where the longitudinal optical coating 95 is anti-reflecting at the wavelength of a laser beam to be amplified. It can be appreciated by one skilled in the relevant art that the features shown in FIG. 8 may be utilized in any other embodiments disclosed in the present specification and that such other configurations lie within the scope of the present invention.

The uniformity of diode-pumped gain along the width W of the laser active slab 11, or the laser active slab 81, is generally determined by the amount of pump power absorbed in the laser active slab 11 or 81. In the laser active slab 11, for example, the uniformity of diode-pumped gain is thus a function of the diode pump power which is incident on the first lateral face 13 and transmitted laterally through the second lateral face 15, that is, the fraction of the incident pump power which is not absorbed in the gain sheet 35. As is well known to someone of ordinary skill in the art, the amount of pump power absorbed in the laser active slab 11 depends on numerous factors, such as: the doping concentration of laser active ions in the active material, the overall path length for absorption of diode pump power, the peak diode pump wavelength, the spectral profile of the diode pump power, and the power density and polarization state of the diode pump power.

Figure 9:
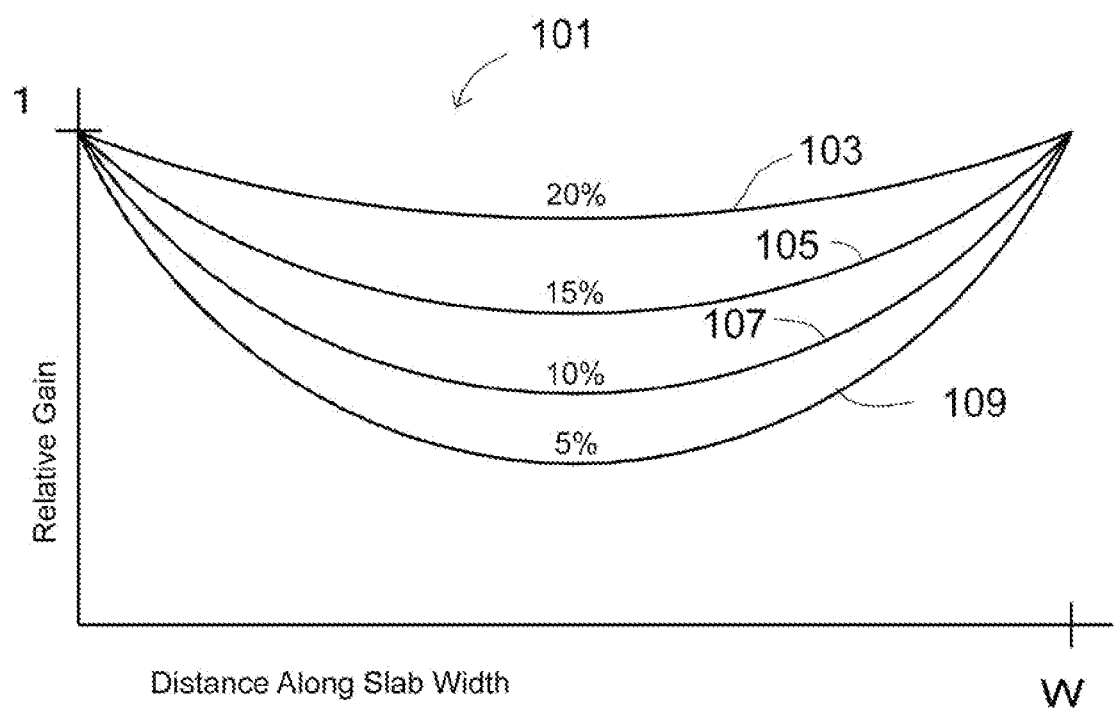
FIG. 9 is a graph of relative gain as a function of lateral displacement along the laser active slab of FIG. 1 for different levels of pump energy absorption.

Referring to graph 101 in FIG. 9, a set of curves 103-109 illustrates how diode-pumped gain at the wavelength of the input laser beam 31 varies along the width W of the laser active slab 11, where the laser active slab 11 is pumped both at the first lateral face 13 and the second lateral face 15 with respective diode bars 21 and 41. Derivation of the curves 103-109 assumes that diode pump light is absorbed in the laser active slab 11 in accordance with the well known Beer's-law exponential profile, and that laser gain at a particular point along the width of the laser active slab 11 is linearly proportional to the diode pump power level at the particular point in the laser active slab 11. The graph 101 illustrates how gain varies along the slab width for different levels of pump power transmitted through the slab: 5%, 10%, 15%, and 20%. In certain cases, such as when a quasi-three-level laser active material is being pumped by the diode bars 21 and 41, it may be desirable to provide a higher level of pump power transmission through the laser active slab 11, so that the gain profile is more uniform along the width of the laser active slab 11. Such a configuration results in greater net gain through the laser amplifier 10, but there may be a tradeoff in that the efficiency of the laser amplifier 10 is reduced.

The magnitude of the unsaturated gain-per-unit-length coefficient, or gain coefficient, $g_O$, established in the diode-pumped gain sheet 35 can be determined from the pump power density as a function of the total diode pump power and the thickness "t" of the gain sheet 35 (see FIG. 2). Accordingly, $g_O$ can be approximately doubled by doubling the pump power incident on the laser active slab 11, or by halving the thickness of the gain sheet 35, assuming there are no gain-reducing processes dependent on pump power density occurring in the laser active slab 11.

The unsaturated power/intensity gain-per-pass, $G_O$, may be given by $G_O = \exp(g_O L)$, where $g_O$ is the unsaturated gain coefficient, and L is the total length of one zig-zag pass through the laser active slab 11. In the embodiment of FIG. 4, for example, the single-pass gain length L is the sum of the lengths of the path legs 71b-71g and the portions of the first and last legs, 71a and 71h, which lie in the gain sheet 35. The single-pass gain length, L, is thus determined by the width W of the laser active slab 11 and the number of path legs that overlap with the diode-pumped gain sheet 35. As can be appreciated by one skilled in the relevant art, the number of path legs which lie in the gain sheet 35 can be determined as a function of the injection angle 'F' of the input laser beam 31 into the slab, the refractive index of the slab material at the lasing wavelength, and the longitudinal length of the gain sheet 35.

Figure 10:
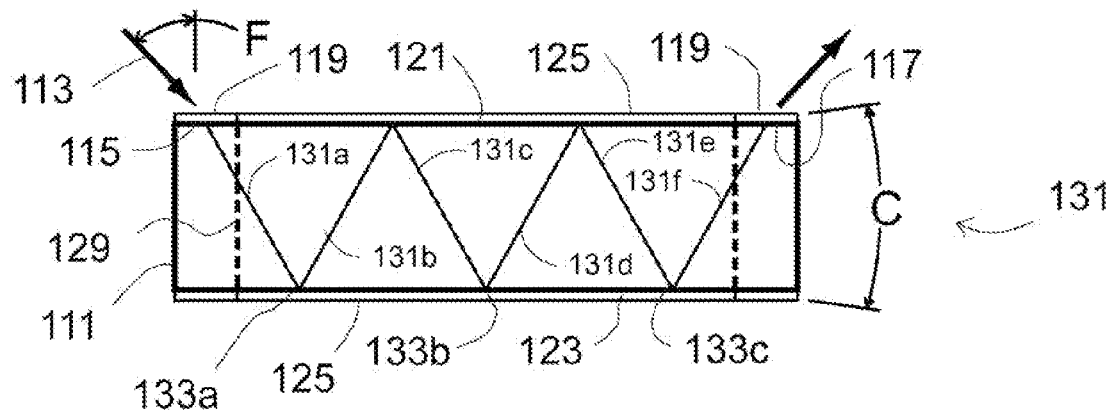
FIG. 10 illustrates a single-pass mode of operation of the laser amplifier of FIG. 1 for a first angle of incidence of the input laser beam.

As shown in FIG. 10, an input laser beam 113, or resonator mode, being amplified is injected into a laser active slab 111 through an input window 115, follows a zig-zag path 131, and exits through an output window 117, each of which windows may include an optical coating 119 highly transmitting at the wavelength of the input laser beam 113. The input laser beam 113 is at an angle of incidence denoted as angle 'F' from the normal to a first lateral face 121, and the zig-zag path 131 is preferably in the plane defined by a gain sheet 129 in the laser active slab 111. The gain sheet 129 may be formed by diode bars (not shown) adjacent the lateral face 121 and a second lateral face 123 as above in FIGS. 1 and 4, for example. The angle of incidence F provides for the input laser beam 113 to undergo multiple internal reflections alternating between the lateral faces 121 and 123, as represented by end points of path legs 131a-131f, while making at least one zig-zag pass through the gain sheet 129, approximately as shown. The first lateral face 121 and the second lateral face 123 may each include an optical coating 125 highly reflecting at the wavelength of the input laser beam 113 and highly transmitting at the wavelength of the pump power producing the gain sheet 129.

The first lateral face 121 is further oriented to form the wedge lateral dihedral angle C with the second lateral face 123, where the laser active slab 111 has slightly wider lateral dimension at the output window 117 than at the input window 115. The points of multiple internal reflections, and the path legs 131a-f thus define a series of path vertices 133a-133c that are non-uniformly spaced along the second lateral face 125. Accordingly, as can be appreciated by one skilled in the relevant art, the fold angle formed by the path legs 131e and 131f is necessarily larger than the fold angle formed by the path legs 131c and 131d by an amount equal to twice the lateral wedge angle C, and the fold angle formed by the path legs 131c and 131d is likewise larger than the fold angle formed by the path legs 131a and 131b by the amount equal to twice the lateral wedge angle C. That is, the fold angles vary as a function of corresponding vertex spacings or positions along the lateral faces 121 and 123. Similarly, the length of the path leg 131b is greater than the length of the path leg 13 and each downstream path leg is greater than a previous path leg, when the input laser beam 113 has a direction of propagation from the input window 115 to the output window 117, that is, from the narrower to the wider end of the laser active slab 111

Preferably, diode bars (not shown) adjacent the laser active slab 111 are positioned such that the diode emitter beamlets (not shown) produced by the first diode bar overlap in the slow-axis direction at the first lateral face 121, and the diode emitter beamlets (not shown) produced by the second diode bar overlap in the slow axis direction at the second lateral face 123, so that the resultant gain sheet 129 is substantially uniform. Accordingly, the path legs 131a-131f remain largely within the gain sheet 129 even though the path vertices 133a-c are non-uniformly spaced along the second lateral face 123. The distance between the vertices 133b and 133c is larger than the distance between the vertices 133a and 133b. That is, the disclosed configuration functions as described above even with standard diode bars having evenly-spaced diode emitters as it is not necessary to match up path vertices 133a-c, for example, with the positions of the adjacent diode emitters (not shown) because the gain sheet 129 is substantially uniform. The disclosed configurations may somewhat reduce the laser gain that can be achieved in the laser active slab 111, in comparison to prior art configurations having uniformly-spaced path vertices and diode emitter beamlets precisely matched to the vertex positions of the zig-zag laser beam path. However, the disclosed configurations described herein provide for greatly simplified alignment requirements to achieve high gain, in comparison to conventional configurations which may include high-power laser diode bars having emitter-to-emitter spacings significantly smaller than one millimeter.

The single-pass gain length 'L' of the zig-zag path 131 is a function of angle of incidence F, among other parameters. This is best illustrated by comparison of the six-leg zig-zag path 131 of FIG. 10 with an eight-leg zig-zag path 135 in FIG. 11 and an eleven-leg zig-zag path 137 in FIG. 12. For purpose of comparison, the laser active stab 111, which comprises a block or slab of the laser active material as described above, can be specified to have a refractive index of about 2.17, a length of approximately fifteen millimeters, and a width of approximately six millimeters. The wedge lateral dihedral angle C may be about 1.0 degree and the gain sheet 129 may have a longitudinal dimension of about ten millimeters. The angle of incidence F in FIG. 10 is about 32 degrees to give a value for the length of the zig-zag path 131 in the gain sheet 129 (i.e., the single-pass gain length L), of at least 33 millimeters (i.e., L≈5.5×6 mm).

Figure 11:
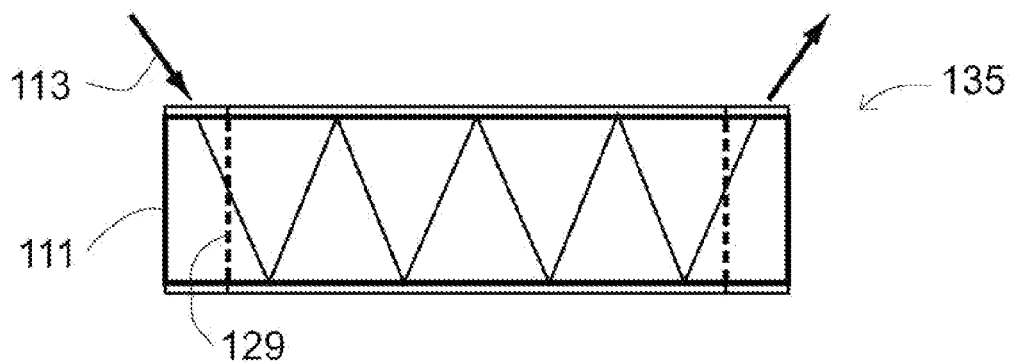
FIG. 11 illustrates a single-pass mode of operation of the laser amplifier of FIG. 1 for a second angle of incidence of the input laser beam.
Figure 12:
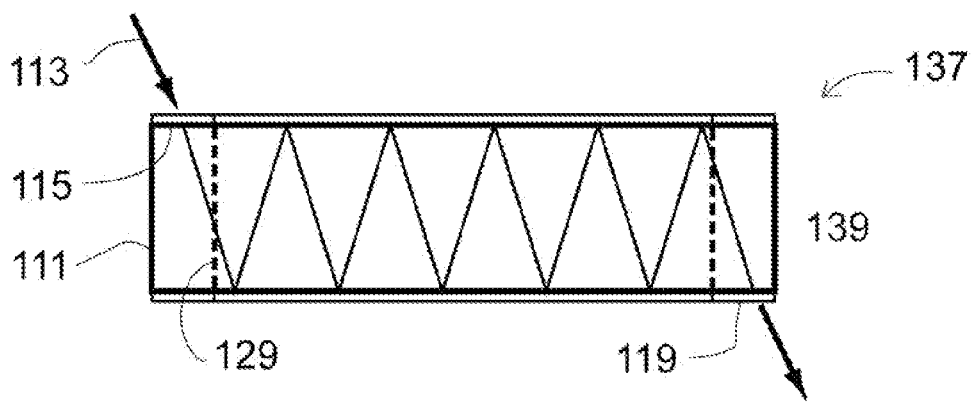
FIG. 12 illustrates a single-pass mode of operation of the laser amplifier of FIG. 1 for a third angle of incidence of the input laser beam.

The angle of incidence F in FIG. 11 is about 21 degrees to give a value for the length of the zigzag path 135 in the gain sheet 129 of at least 42 millimeters (i.e., L≈7.0×6 mm). The angle of incidence F in FIG. 12 is about 7.5 degrees to give a value for the single-pass gain length L of at least 57 millimeters (i.e., L≈9.5×5 mm). In this configuration, the input laser beam 113 follows the zig-zag path 137 which exits from the laser active slab 111 at an alternate output window 139, where the output window 139 may include the optical coating 119. For an unsaturated gain coefficient, $g_O$ of about 1.5 cm$^{-1}$, a value which can be achieved in an active medium such as Nd:YVO$_4$ pumped with two twenty-watt diode bars, for example, the unsaturated gain $G_O$ values corresponding to the single-pass gain lengths L of FIGS. 10-12 are about 141, 544, and 5,166, respectively.

The process of achieving high gain and efficient extraction of power and energy from the diode-pumped laser amplifier 10 in FIG. 4, for example, includes mode matching the input laser beam 31 to the gain sheet 35. Mode matching can be accomplished by spatially overlapping the volume occupied by the amplified beam following the zig-zag path 71 with the diode-pumped volume defined by the gain sheet 35. In general, proper mode matching in the transverse direction of the laser active slab 11 requires that the thickness of the gain sheet 35 be nominally equal to or slightly larger than the vertical diameter of the input laser beam 31, or mode, at essentially all points along the zig-zag path 71. Alternatively, the input laser beam 31 may be focused in a vertical plane perpendicular to the first transverse face 51, such that at one or more points along the zig-zag path 71, the transverse diameter of the input laser beam 31, or mode, may be substantially smaller than the thickness of the gain sheet 35.

Proper mode matching in the horizontal plane of the zig-zag path 71 may depend upon the application in which the laser amplifier 10 is being used, for example, as a pre-amplifier, as a power amplifier, or in a laser oscillator. In general, once the thickness of the gain sheet 35 and the unsaturated gain-per unit-length ($g_O$) have been determined, the input angle F and the corresponding number of vertices in the zig-zag path 71 are adjusted to achieve desired single-pass gain length L and extraction efficiency consistent with the particular geometrical configuration of the laser active slab 11.

The process of achieving high gain and efficient extraction of power and energy from the diode-pumped laser amplifier 10, for example, may include increasing the diameter of the input laser beam 31, or mode, in a transverse plane using beam-shaping methods well known to one of ordinary skill in the relevant art. Preferably, the transverse beam diameter inside the laser active slab 11 is maximized along the zig-zag path 71 without incurring significant beam clipping and resultant diffraction losses either at the edges of the second optical coating 47 or at the edges of the laser active slab 11, as the input laser beam 31 enters and exits the laser active slab 11 through the input window 33 and the output window 37, respectively.

When the laser amplifier 10 is operated at power levels of more than a few watts of average diode pump power, the cooling surfaces 61 and 65, shown in FIG. 2, may be used to remove heat from the laser active slab 11. Cooling the first transverse face 51 and the second transverse face 53 in this manner produces a substantial thermal gradient in the transverse direction, that is, along a path normal to both the first transverse face 51 and the second transverse face 53. Such a linear thermal gradient permits the amplification of a linearly polarized laser beam, whether the polarization is in the transverse direction or in the plane of the gain sheet 35, without significant distortion of the polarization state of the laser beam or mode being amplified.

Because the thermal gradient is perpendicular to the plane of zig-zag path 71 (i.e., the plane of the gain sheet 35) when the laser active slab 11 is cooled by means of the cooling surfaces 61 and 65 at the first and second transverse faces 51 and 53, the thermal gradient may result in an undesirable thermally-induced lensing and an optical wedge that acts to steer the input laser beam 31, or mode, in a direction substantially perpendicular to the plane of the zig-zag path 71. This optical wedge effect is produced when the temperature differential between the first transverse face 51 and the second transverse face 53 results in an unacceptable level of beam steering. This temperature differential is a function of the diode pump power being absorbed in the laser active slab 11, the thermal properties of the laser active material, differences in thermal resistances for top and bottom heat removal paths, and other factors well-know to one of ordinary skill in the relevant art. Accordingly, such thermally-induced optical wedge effects in the plane perpendicular to the plane of the zig-zag path 71 can be minimized by maintaining the cooling surfaces 61 and 65 at approximately the same temperature, and by providing top and bottom heat removal paths of the same or similar thermal resistances.

Figure 13:
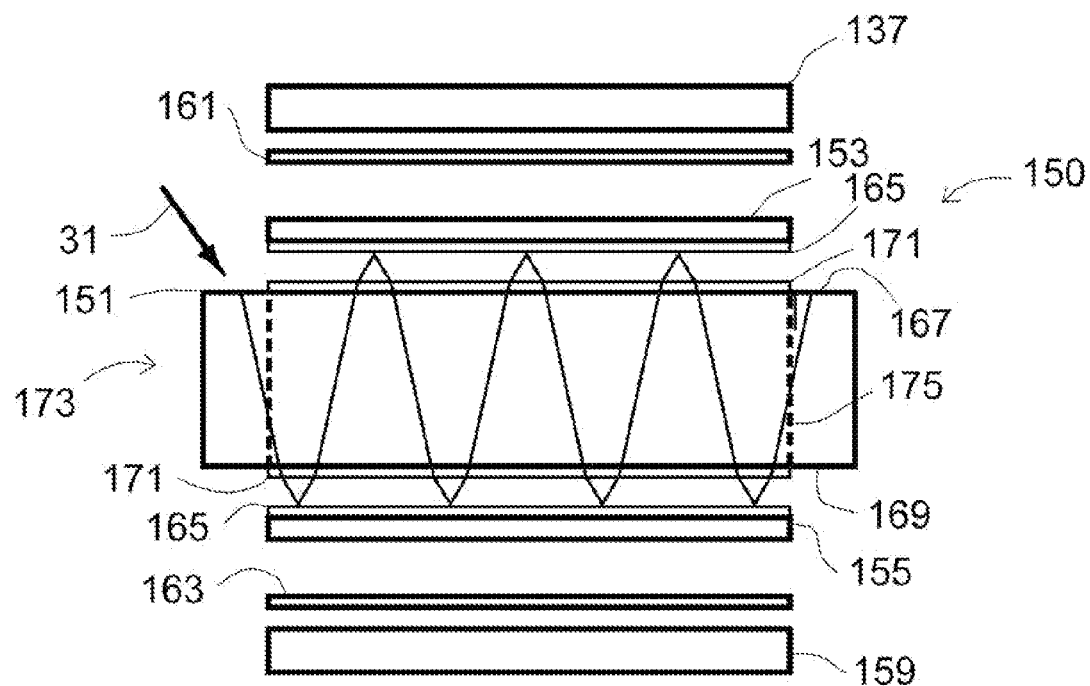
FIG. 13 illustrates an alternative embodiment of the laser amplifier of FIG. 1 including side mirrors.

There is shown in FIG. 13 an alternative laser amplifier 150 including a laser active slab 151, first and second side mirrors 153 and 155, first and second diode bars 157 and 159, and first and second microlenses 161 and 163. The first and second diode bars 157 and 159 cooperatively function to generate a gain sheet 175 in the laser active slab 151. The side mirrors 153 and 155 include an optical coating 165 highly reflecting to the wavelength of the input laser beam 31 and highly transmitting at the wavelength of the pump power produced by the diode bars 157 and 159. The side mirrors 153 and 155 are preferably positioned within two millimeters of lateral faces 167 and 169, respectively. The lateral faces 167 and 169 each have an anti-reflection coating 71 designed for low reflectivity at both the lasing wavelength and the diode pump wavelength. The laser active slab 151 may comprise a block of the laser active material as described above.

Preferably, the anti-reflection coating 171 is applied along the entire lengths of the respective lateral faces 167 and 169. The substrates of the side mirrors 153 and 155 are selected so as not to be absorbing at the wavelength of the diode pump power, and further may have an anti-reflection coating (not shown) at the diode pump wavelength on the surfaces facing the diode bars 157 and 159. The first side mirror 153 forms a mirror dihedral angle (not shown for clarity of illustration) with the second side mirror 155, where the mirror dihedral angle is equivalent to the wedge lateral dihedral angle C of FIG. 5, above. The side mirrors 153 and 155 are further aligned and mounted so as to produce the zig-zag path 173 through the gain sheet 175 in the laser active slab 151.

Figure 14:
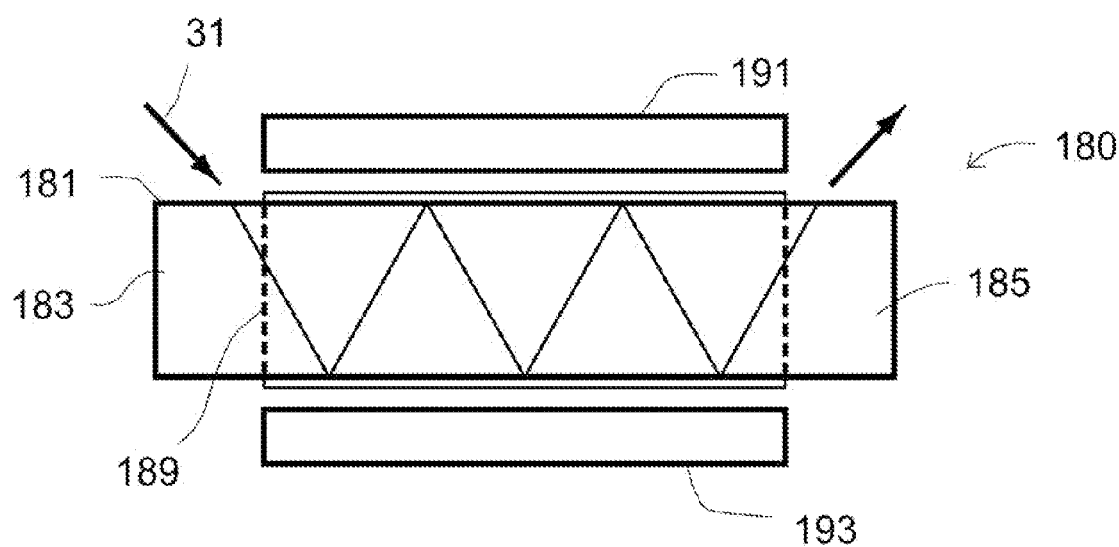
FIG. 14 illustrates an alternative embodiment of the laser amplifier of FIG. 1 showing undoped end sections in the laser active slab.

There is shown in FIG. 14 an embodiment of the present invention suitable for use with quasi-three-level laser materials, for example, where a laser amplifier 180 includes a laser active slab 181 and diode pump sources 191 and 193. The particular configuration of laser active slab 181 functions to reduce unpumped regions in the laser active slab 181 that may otherwise act as absorbing regions at the lasing wavelength. The laser active slab 181 includes end sections 183 and 185 that are fabricated from the same or similar host material comprising an active section 187 of the laser active slab 181. However, the end sections 183 and 185 are not doped with laser active ions, whereas the active section 187, which includes a gain sheet 189, is doped with laser active ions, such as in the laser active material as described above.

Pump power is provided to the laser active slab 181 by the diode pump sources 191 and 193. The physical length of each of the diode pump sources 191 and 193 is approximately equal to the longitudinal length of the active section 187 so that the entire length of the active section 187 can be pumped with diode pump power. Because no active ions are present in the end sections 183 and 185, there is no unwanted absorption loss at the lasing wavelength in the end sections 183 and 185. The end sections 183 and 185 can be optically contacted and bonded to the active section 187 using diffusion bonding techniques, or other bonding methods not requiring epoxy, as have been made available through commercial suppliers such as VLOC Corporation (New Port Richey, Fla.) and Onyx Optics (Dublin, Calif.).

Figure 15:
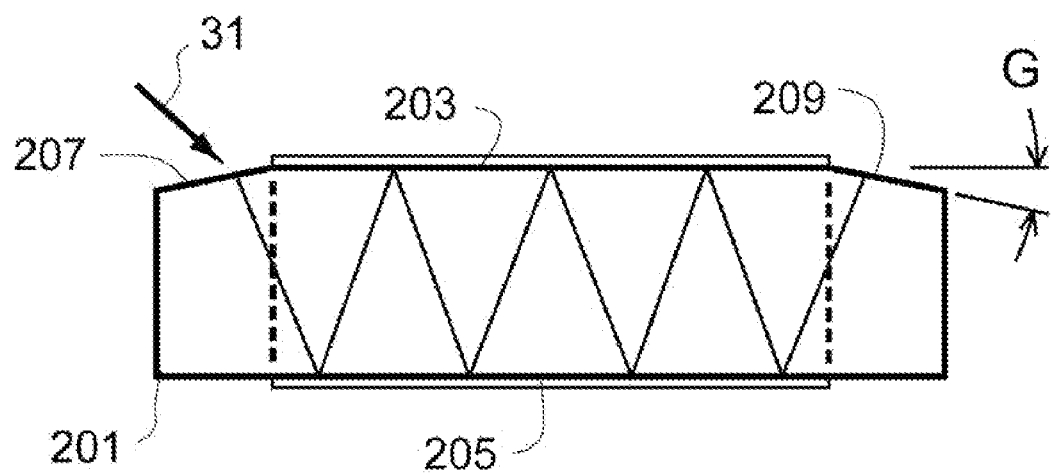
FIG. 15 illustrates an alternative embodiment of the laser amplifier of FIG. 1 including an angled entrance face and an exit facet in the laser active slab.

FIG. 15 illustrates an alternative embodiment of a laser active slab 201 that includes a first lateral face 203 and a second lateral face 205. The first lateral face 203 includes an angled entrance window 207 and an angled exit window 209. The angled entrance window 207 and the angled exit window 209 are each oriented at an angle 'G' from the plane of the first lateral face 203, where the angle G is about 3° to 5". That is, the angled entrance window 207 forms a window dihedral angle of 175° to 177° with the first lateral face 203. The angled entrance window 207 allows the input laser beam 31 to pass into the laser active slab 201 at a larger entrance angle from the normal to the first lateral face 203, than would be the case if the angled entrance window 207 were coplanar with the first lateral face 203. Accordingly, larger entrance and exit angles can help prevent partial blockage of the input laser beam 31 by, for example, a diode pump source (not shown) positioned close to the first lateral face 203.

Figure 16:
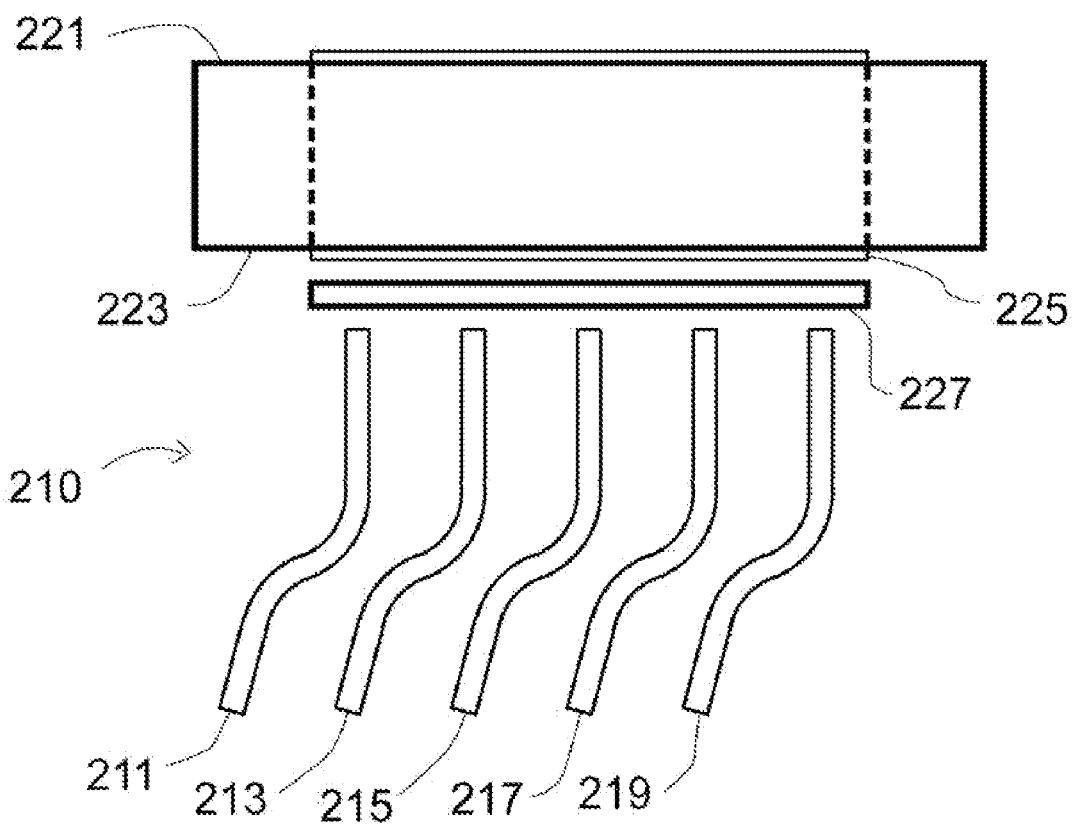
FIG. 16 illustrates an alternative embodiment of the laser amplifier of FIG. 1 including a one-dimensional array of optical fibers used for delivery of pump power to the laser active stab.

The illustration in FIG. 16 shows a one-dimensional array 210 of optical fibers 211-219 used to deliver diode pump light from a diode bar (not shown) to a lateral face 223 of a laser active slab 221. The lateral face 223 may include an optical coating 225 highly transmitting at a wavelength of the diode pump power and highly reflecting at the lasing wavelength. The individual optical fibers 211-219 are configured into the one-dimensional array 210 such that pump light is directed onto the lateral face 223 in a similar pattern as an adjacent diode bar, such as in the laser amplifier configurations described above. A collimator lens 227 may be used to quasi-collimate optical fiber emission in a transverse plane before entering the laser active slab 221.

Figure 17:
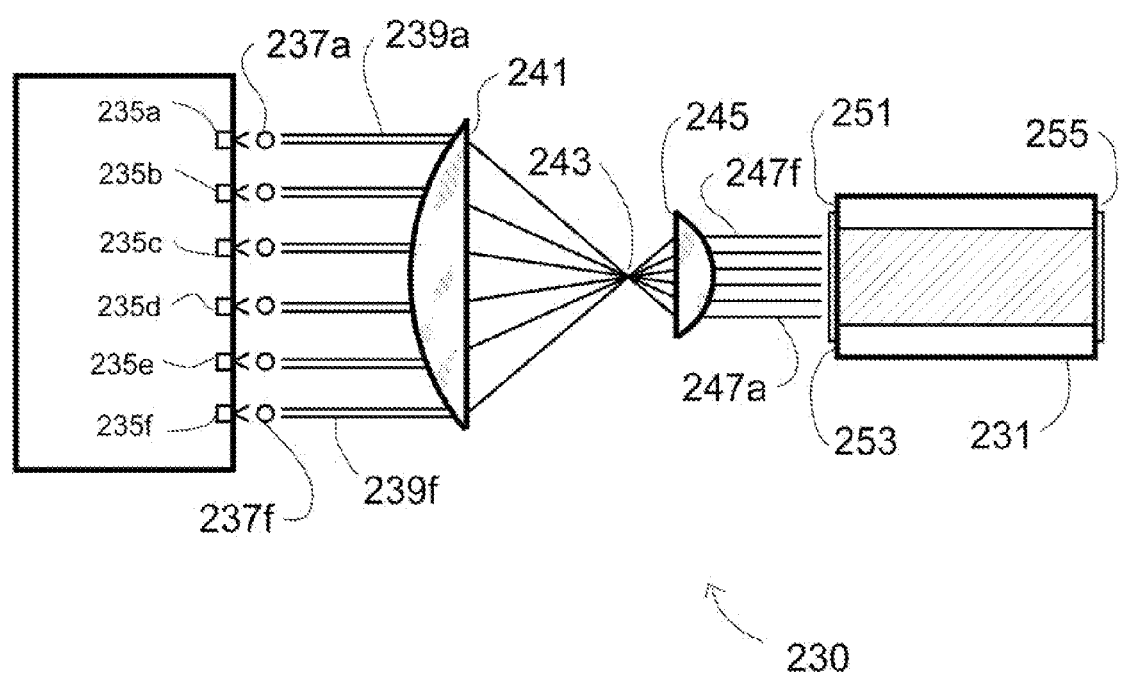
FIG. 17 illustrates an alternative embodiment of the laser amplifier of FIG. 1 pumped with a two-dimensional laser diode array having multiple diode bars.

FIG. 17 illustrates an alternative configuration for a laser amplifier 230. A laser active slab 231 is pumped with a two-dimensional laser diode array 233 having multiple diode bars, 235*a-f*, such as available from Coherent Inc (Santa Clara, Calif.) or from Cutting Edge Optronics (St. Charles, Mo.). A corresponding set of microlenses 237*a-f* may be used to collimate the fast axis of each diode bar 235*a-f* in the two-dimensional laser diode array 233, as described above for one-dimensional diode array bars. A set of multiple diode bar beams 239*a-f* propagate along generally parallel paths in a plane perpendicular to the diode junction planes. A first cylinder lens 241 may focus the multiple diode bar beams 239*a-f* to a common line focus 243. A second cylinder lens 245 may re-collimate the diode bar beams 239*a-f* so that they again propagate parallel to one another as a set of de-magnified beams 247*a-f*, but with a greatly reduced pitch between the de-magnified beams 247*a-f* than in the original two-dimensional laser diode array 233.

Figure 18:
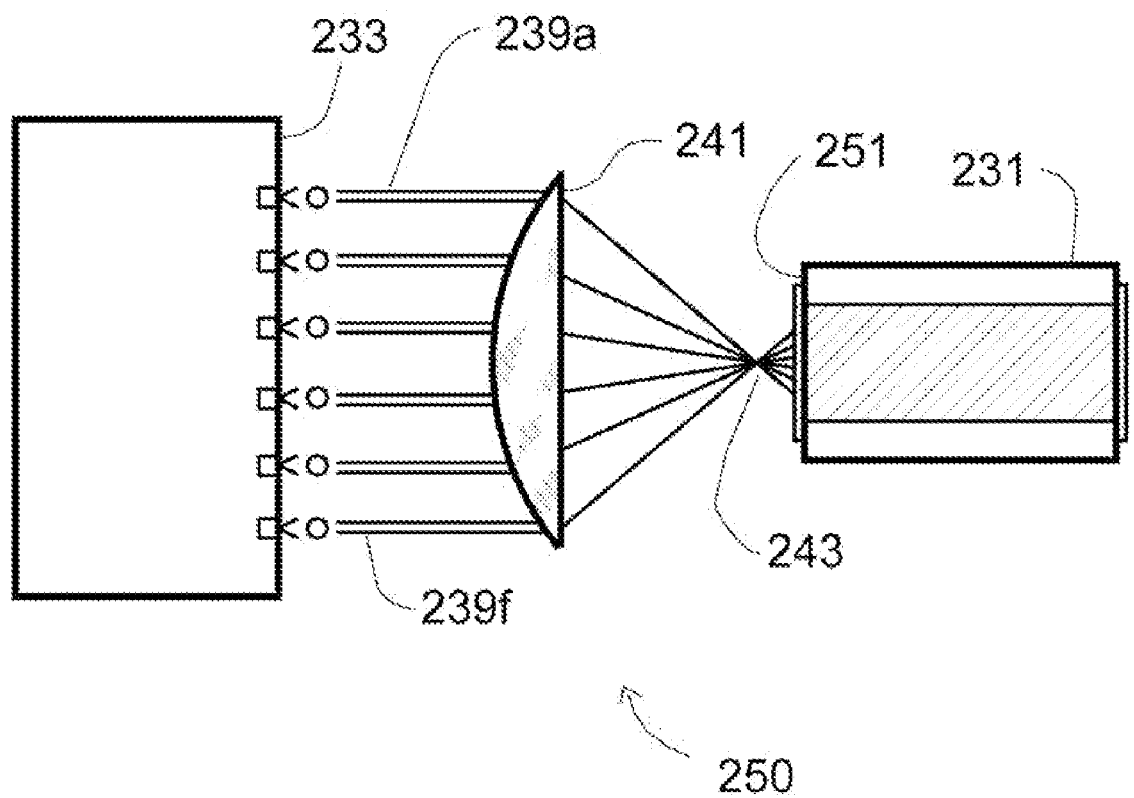
FIG. 18 illustrates an alternative embodiment of the laser amplifier of FIG. 17.

The de-magnified beams 247*a-f* enter the laser active slab 231 through a lateral face 251 which may include an optical coating 253 highly transmitting at wavelength of the pump power and highly reflecting at a lasing wavelength. Alternatively, a second two-dimensional laser diode array (not shown) could be added to pump the laser active slab 231 at a second lateral face 255. The configuration of FIG. 17 can be modified as shown in FIG. 18 by eliminating the second cylinder lens 245 to form a laser amplifier 250. The two-dimensional laser diode array 233 and the first cylinder lens 241 are positioned such that the line focus 243 is positioned just outside the laser active slab 231 adjacent the lateral face 251, or on the lateral face 251 (not shown), or inside the laser active slab 231 adjacent the lateral face 251 (not shown). In the laser amplifier 250, the angle at which the diode bar beams 239*a-f* converge or diverge after entering the laser active slab 231 is reduced, relative to the angles outside the laser active slab 231, by the relevant refractive index 'n' of the slab material at the diode pump wavelength and pump polarization.

An optimal wedge lateral dihedral angle C (shown in FIG. 5), or an optimal wedge lateral dihedral angle D (shown in FIG. 7), may be found by empirically determining the smallest dihedral angle for a new, functional laser active slab (not shown) that minimizes the longest possible path length of parasitic amplified spontaneous emission. It can be appreciated that if the new laser active slab is designed to overcome emissions propagating along the longest folded path in the new laser active slab, the design of the new laser active slab will also overcome emissions propagating along shorter paths. Parasitic amplified spontaneous emission generated near a longitudinal face of a laser active slab typically follows a longer path length through the gain sheet than amplified spontaneous emission generated away from the longitudinal faces of the laser active slab. Parasitic amplified spontaneous emission is herein defined as amplified spontaneous emission that builds up in the gain sheet along a folded path different from the intended beam path for the input laser beam.

Figure 19:
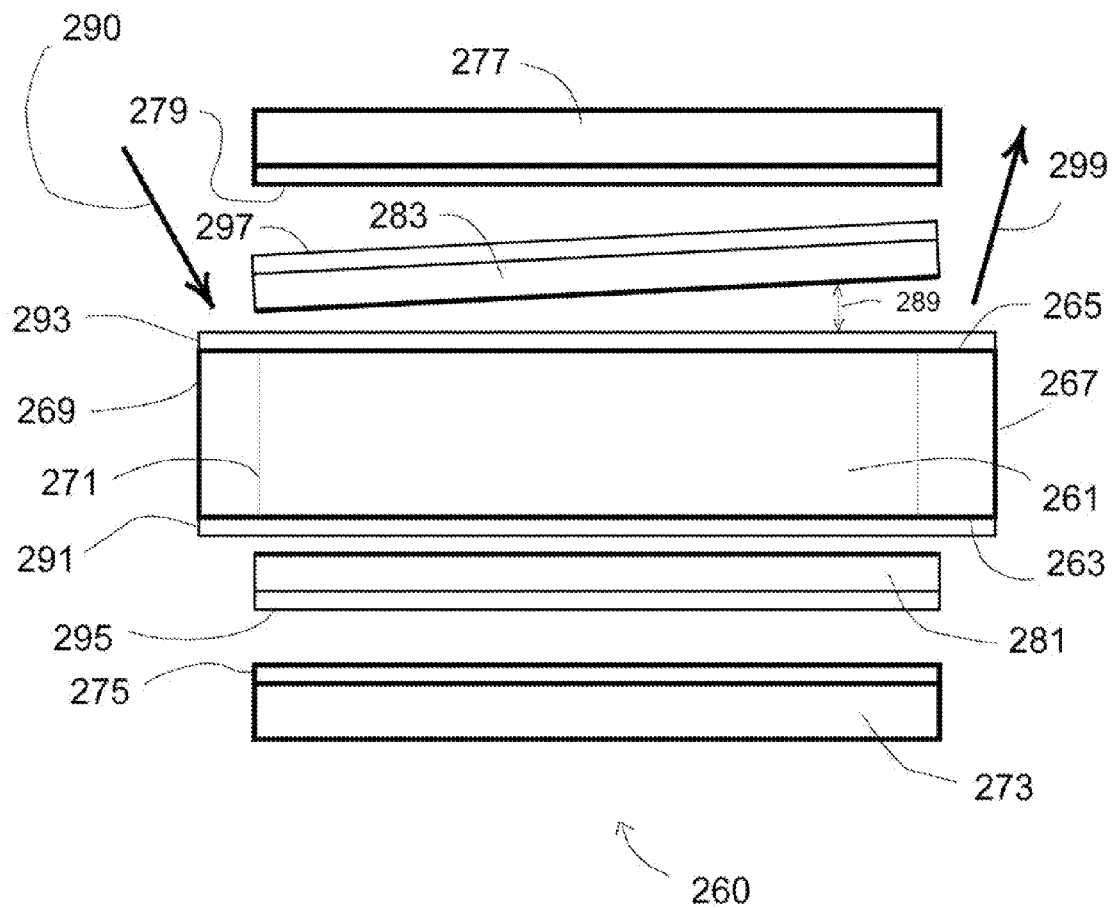
FIG. 19 illustrates a setup for determining optimal wedge angle for a laser active slab, in accordance with the present invention.

The empirical process for determining an optimal wedge lateral dihedral angle may use a simulation laser amplifier 260 such as shown in FIG. 19 and may comprise a method described by reference to a flow diagram 300, in FIG. 20. Referring to FIG. 19, the simulation laser amplifier 260 includes a simulator slab 261 comprising the same laser active material and having substantially the same dimensions to be used for the new laser active slab. The simulator slab 261 includes parallel lateral faces 263 and 265, and wedged longitudinal faces 267 and 269. That is, the simulator slab 261 is not wedged laterally, but the new laser active slab will be wedged at the optimal wedge lateral dihedral angle found using the method of FIG. 20. A gain sheet 271 may be produced in the simulator slab 261, for example, by a first diode bar 273 with a first microlens 275 in combination with a second diode bar 277 and a second microlens 279.

The design considerations used in determining the linear dimensions of the new laser slab include initially ascertaining the pump power and output power desired for a new laser amplifier. High pump and output power increase the probability of fracture in the new laser active slab, especially if the new laser active slab has a relatively large thickness-to-width ratio. In the disclosed embodiments, a relatively higher pump beam power intensity is directed into a relatively thin laser active slab to produce a gain sheet approximately one half (0.5) to one (1.0) millimeter thick.

A first simulator mirror 281 is disposed adjacent the simulator slab 261 between the lateral face 263 and the diode bar 273. A second simulator mirror 283 is disposed adjacent the simulator slab 261 between the lateral face 265 and the diode bar 277. The first simulator mirror 281 is parallel to the lateral face 263 and the second simulator mirror 283 is oriented to form a dihedral angle with the lateral face 265 and a mirror dihedral angle with the first simulator mirror 281, as indicated by arrow 289. This setup may be used to determine the optimal wedge lateral dihedral angle C for a particular active material, for the pump power density, and for other design parameters. Alternatively, to determine the optimal wedge lateral dihedral angle D, both the first simulator mirror 281 and the second simulator mirror 283 can be oriented at the same dihedral angle (not shown) to the respective lateral faces 263 and 265. It can be appreciated by one skilled in the relevant art that the simulation laser amplifier 260 can be used to replicate any of the embodiments described above while allowing the wedge lateral dihedral angle C or D to be varied for the purpose of obtaining empirical data.

The lateral face 263 may have an optical coating 291 highly transmitting at the wavelength of the first diode bar 273 and highly transmitting at the wavelength of an input laser beam 290. Similarly, the lateral face 265 may have an optical coating 293 highly transmitting at the wavelength of the second diode bar 277 and highly transmitting at the wavelength of the input laser beam 290. The first simulator mirror 281 may include an optical coating 295 highly transmitting at the wavelength of the first diode bar 273 and highly reflecting at the wavelength of the input laser beam 290, and the second simulator mirror 283 may include an optical coating 297 highly transmitting at the wavelength of the second diode bar 277 and highly reflecting at the wavelength of the input laser beam 290. Operating parameters for the simulation laser amplifier 260 can be monitored by electronic equipment (not shown) that may measure and record the power output of the first diode bar 273, the second diode bar 275, and an amplified laser beam 299.

Figure 20:
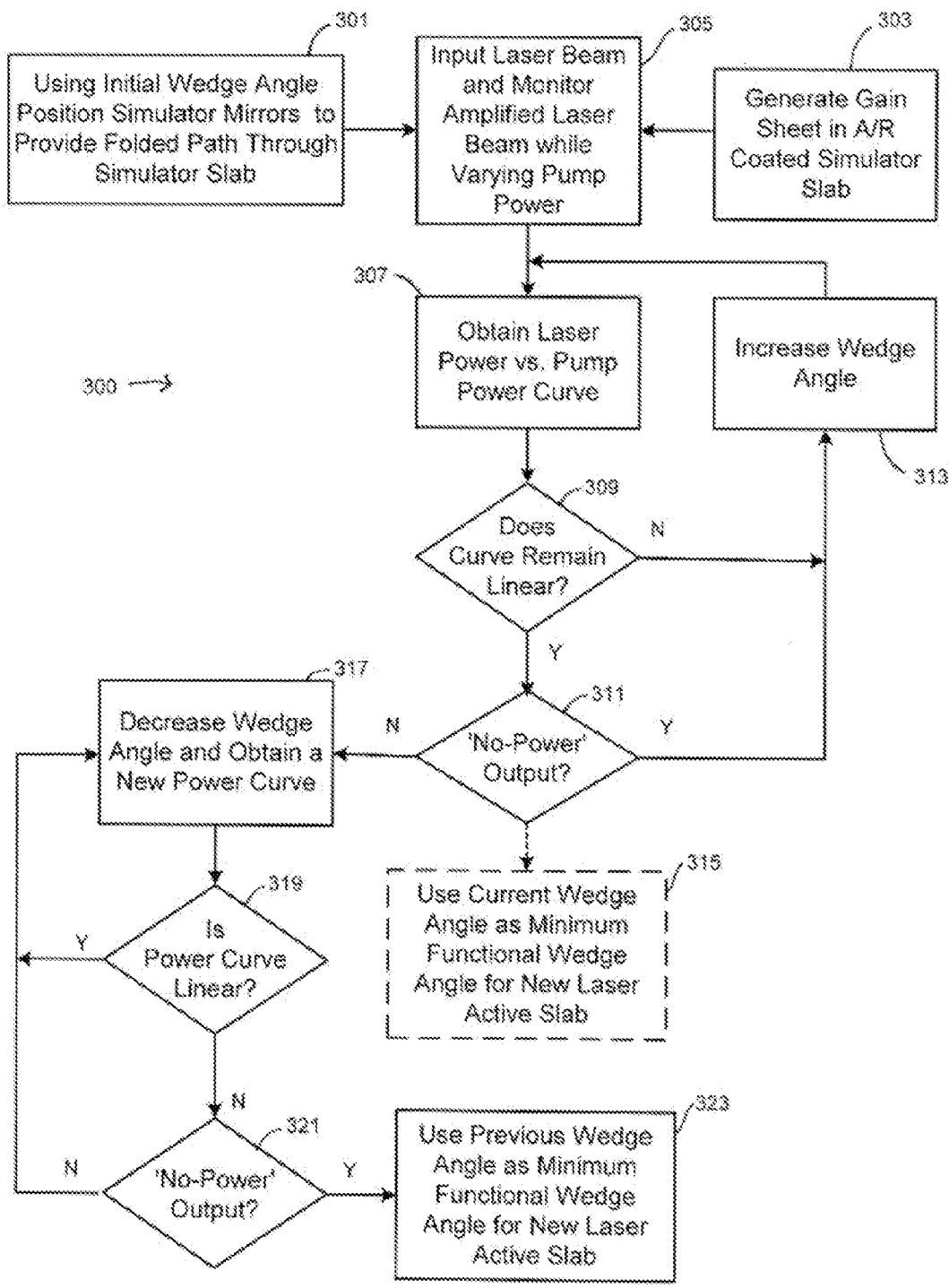
FIG. 20 is a flow diagram illustrating a procedure for determining optimal wedge angle for a laser active slab using the setup of FIG. 19.

Referring now to step 301 in the flow diagram 300 shown in FIG. 20, an initial mirror dihedral angle, indicated by the arrow 289 in FIG. 19, is selected to produce a zig-zag path for an incoming laser beam 290 entering the simulator slab 261 and exiting as an amplified laser beam 299. The gain sheet 271 is generated in the simulator slab 261, at step 303, where the simulator slab 261 preferably includes the optical coatings 291 and 293. The input laser beam 290 is directed into the gain sheet 271 and the pump power of the diode bars 273 and 277 is varied, at step 305, from which action an amplified laser power vs. pump power curve, or input/output power curve, may be obtained for the initial mirror dihedral angle, at step 307.

Figure 21A:
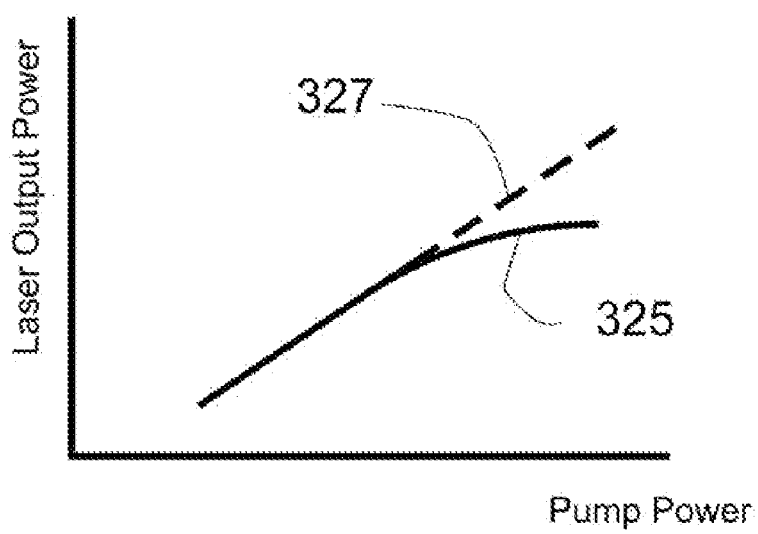
FIGS. 21A and 21B are graphs of laser output power as a function of pump power as may be obtained using the setup of FIG. 19.
Figure 21B:
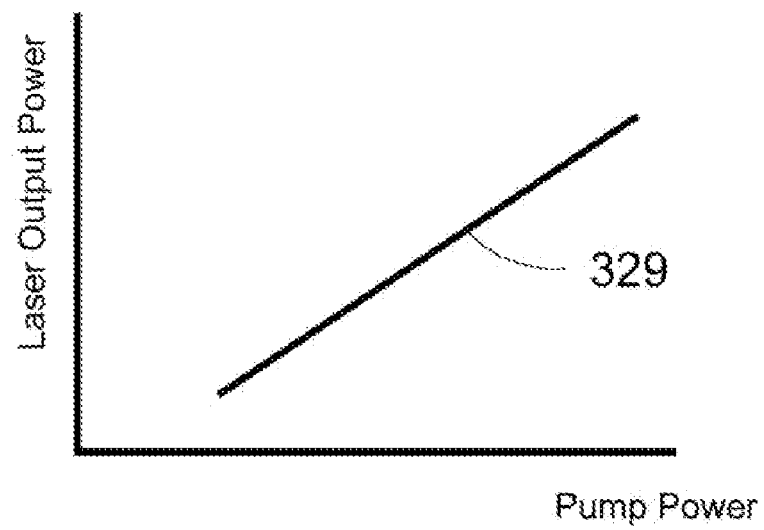

If, at decision block 309, the input/output power curve obtained resembles a nonlinear power curve, such as curve 325 shown in FIG. 21A which falls off from a linear trace 327, this may indicate the presence of unwanted parasitic amplified spontaneous emission in the gain sheet 271. Accordingly, the mirror dihedral angle may be increased, at step 313, and a new input/output power curve may be obtained, at step 307. If, at decision block 309, the input/output power curve obtained resembles a linear power curve 329, such as shown in FIG. 21B, this may be an indication that the mirror dihedral angle is sufficiently large to prevent the buildup of unwanted parasitic amplified spontaneous emission in the gain sheet 271. As a further check on the presence or absence of unwanted parasitic amplified spontaneous emission, at decision block 311, the input laser beam 290 may be removed or blocked from the simulator slab 261 to determine whether a parasitic amplified spontaneous emission signal emitted from the gain sheet 271 exceeds a predetermined level, even with no input laser beam 290 present. If a parasitic amplified spontaneous emission signal exceeds the predetermined level, the mirror dihedral angle may be increased, at step 313.

If there is no parasitic amplified spontaneous emission signal detected or if the parasitic amplified spontaneous emission signal is at or below the predetermined level at decision block 311, the current mirror dihedral angle may be used as the minimum functional wedge lateral dihedral angle for the new laser active slab, at step 315. Alternatively, if no parasitic amplified spontaneous emission signal is detected, or if the parasitic amplified spontaneous emission signal is at or below the predetermined level, at decision block 311, the mirror dihedral angle may be decreased, at step 317, to verify that the current mirror dihedral angle is the optimal wedge lateral dihedral angle for the simulator active slab 261. A new input/output power curve is obtained and evaluated, at step 317. If the new input/output power curve obtained resembles a linear power curve, at decision block 319, the mirror dihedral angle may be further decreased and yet another new input/output power curve obtained, at step 317.

If the current input/output power curve obtained resembles a nonlinear power curve, at decision block 319, a parasitic amplified spontaneous emission signal detection may be conducted to verify that the previous mirror dihedral angle qualifies as the optimal wedge lateral dihedral angle, at decision block 321. If no parasitic amplified spontaneous emission signal is detected, or if the parasitic amplified spontaneous emission signal is at or below the predetermined level, at decision block 321, the mirror dihedral angle may be decreased, at step 317, and another new input/output power curve obtained and evaluated. If the parasitic amplified spontaneous emission signal exceeds the predetermined level, at decision block 321, the previous mirror dihedral angle may be used as the optimal wedge lateral dihedral angle for the new laser active slab, at step 323.

Figure 22:
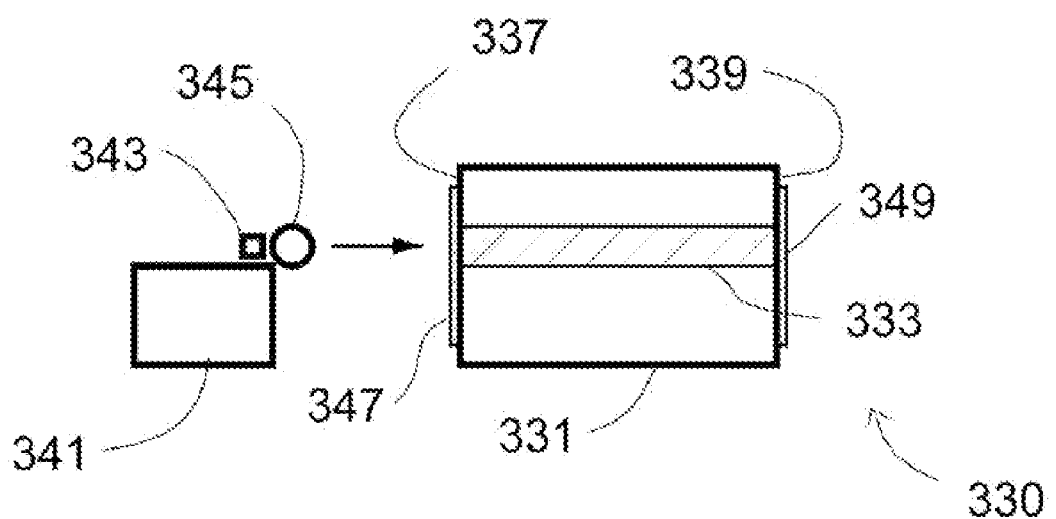
FIG. 22 is a diagrammatical illustration of a laser amplifier that includes a single diode pump source.

In an alternative embodiment, shown in FIG. 22, a laser amplifier 330 may include a single diode pump source 341 comprising a block of the laser active material as described above, a pump bar 343, and a microlens 345. The pump bar 343 may comprise an array of discrete singe-emitter diodes lasers, a one-dimensional laser diode array bar, a fiber-coupled one-dimensional laser diode array bar, or a two-dimensional laser diode array, for example, and may be continuous-wave or pulsed diode pump sources. The diode pump source 341 produces a gain sheet 333 in a wedged laser active slab 331 via a one-pass or a two-pass pumping operation.

For two-pass pumping, the wedged laser active slab 331 may include a lateral face 337 with a thin-film coating 347 that is highly reflecting at the lasing wavelength, and highly transmitting at the diode pump wavelength, and a lateral face 339 with a thin-film coating 349 that is highly reflecting at the lasing wavelength and highly reflecting at the diode pump wavelength. Diode pump power not absorbed in the first pass through the wedged laser active slab 331 is reflected back toward the pump bar 343 for a second pass leg through the wedged laser active slab 331. In this way, the path length for absorption of pump light is increased by a factor of two.

Figure 23:
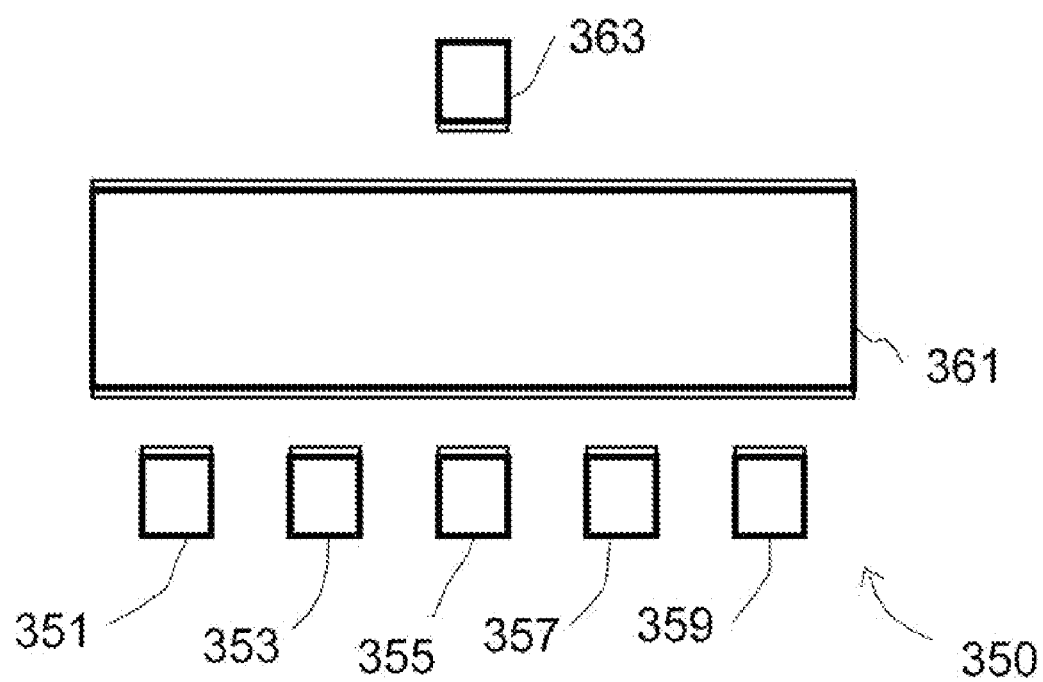
FIG. 23 is a diagrammatical illustration of a laser amplifier that includes a plurality of diode pump sources.

In another alternative embodiment, shown in FIG. 23, a laser amplifier 350 may include a linear array of diode pump sources 351-359, such as semiconductor diode lasers, on a first side of a wedged laser active slab 361, and a single diode pump sources 363 on a second side of the laser active slab 361. The diode pump sources 351-59 and 343 may comprise an array of discrete single-emitter diode lasers, a one-dimensional laser diode array bar, a fiber-coupled one-dimensional laser diode array bar, or a two-dimensional laser diode array, for example, and may be continuous-wave or pulsed-diode pump sources. Other embodiments (not shown) may include diode pump sources all on the first side of the wedged laser active slab 361. It should be understood that the pump sources need not be arranged symmetrically about the wedged laser active slab 361, and that various types of pump sources can be used in the laser amplifier 350 need not all be similar to each other.

Figure 24:
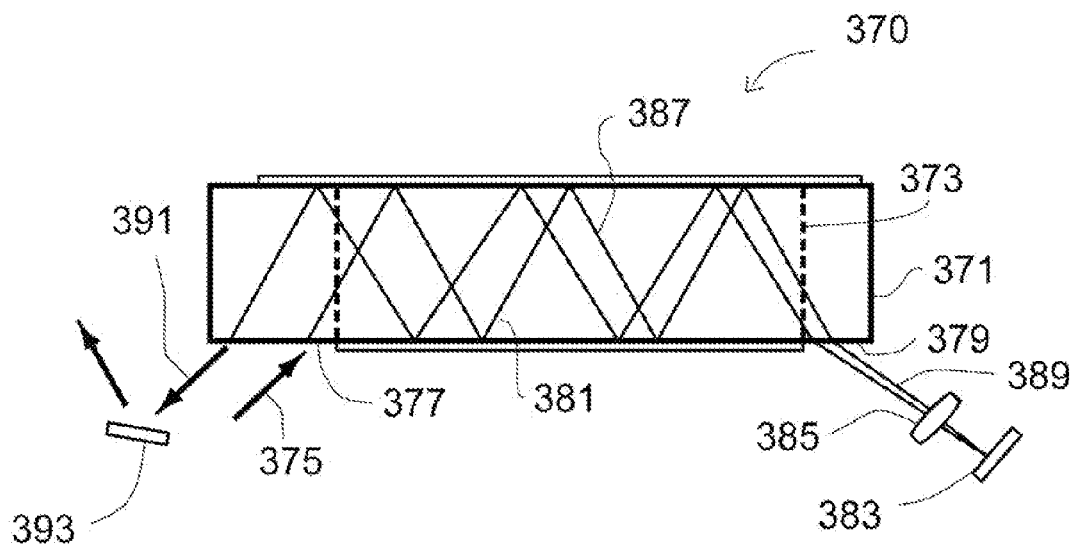
FIG. 24 is a diagrammatical illustration of an embodiment of a two-pass laser amplifier, in accordance with the present invention.

A wedged laser active slab in accordance with the present invention can be advantageously utilized in configurations that allow the incoming laser beam or resonator mode being amplified to make, for example, two, three, four, or more multi-passes through the diode-pumped gain sheet, as can be understood with additional embodiments described below. Geometrical methods alone can be utilized to separate input and output beams, or a Faraday rotator or isolator device can be included for beam separation. In preferred embodiments, the longitudinal faces of the laser active slab are wedged as well as the lateral faces to provide for dissipation of unwanted amplified spontaneous emission. There is shown in FIG. 24 a diagram of a two-pass laser amplifier 370 including a wedged laser active slab 371 and one or more diode pump sources (not shown) used to produce a gain sheet 373. An incoming laser beam 375 enters the wedged laser active slab 371 at a first window 377 and exits at a second window 379 after making a first zig-zag pass 381 through the gain sheet 373 in the wedged laser active slab 371.

An external mirror 383 that is highly reflecting at the lasing wavelength may be used to reflect a amplified one-pass laser beam 389 back into the wedged laser active slab 371 through the window 379, but at a slightly different angle from an output angle so that the one-pass-amplified laser beam 389 makes a second zig-zag pass 387 through the gain sheet 373. A two-pass-amplified laser beam 391 emerges at the window 377 at a substantially different angle from the incidence angle of the incoming laser beam 375. The two-pass-amplified laser beam 391 may be separated from the incoming laser beam 375 using, for example, a pick-off mirror 393 that is highly reflecting at the lasing wavelength. An optional lens 385 may comprise a cylinder lens or a spherical lens, for example, depending on the size of the incoming laser beam 375. The optional lens 385 may serve to maintain mode matching for the second zig-zag pass 387 for the amplified laser beam 389 through the wedged laser active slab 371.

Figure 25:
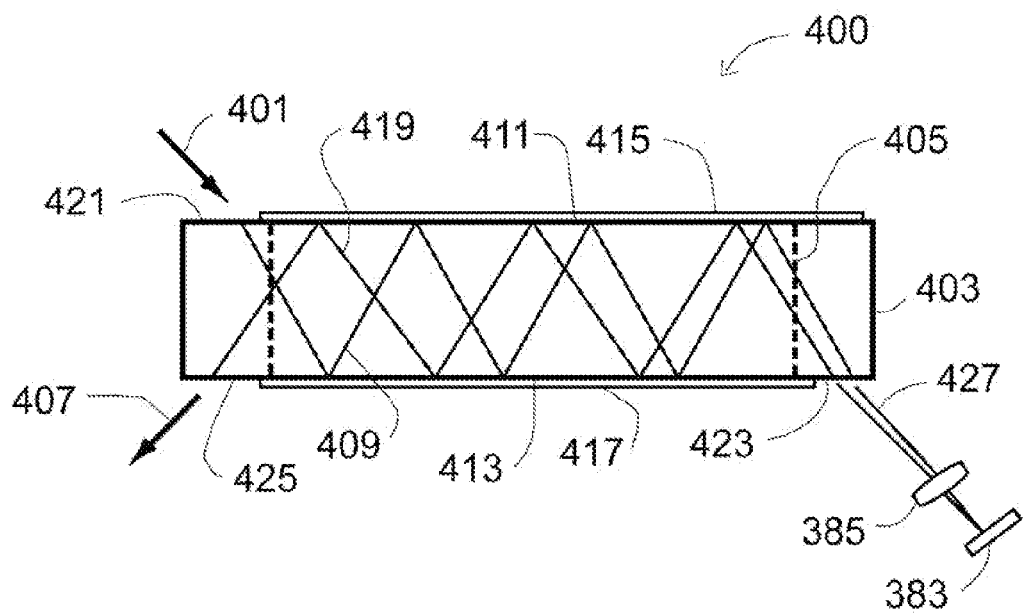
FIG. 25 is a diagrammatical illustration of an alternative embodiment of the two-pass laser amplifier of FIG. 24.

In another embodiment, shown in FIG. 25, a laser amplifier 400 includes one or more diode pump sources (not shown) producing a gain sheet 405 in a wedged laser active slab 403 comprising a block of the laser active material as described above. The laser amplifier 400 is configured as a two-pass amplifier in which an incoming laser beam 401 enters a first lateral face 411 of the wedged laser active slab 403, makes a first zig-zag pass 409 through the gain sheet 405, and a two-pass-amplified laser beam 407 emerges from a second lateral face 413 of the wedged laser active slab 403 after making a second zig-zag pass 419 through the gain sheet 405. A first optical coating 415 is patterned to have an entrance window 421, and a second optical coating 417 is patterned to have an entrance/exit window 423 and an exit window 425. Both the first optical coating 415 and the second optical coating 417 are highly reflecting at the laser wavelength.

The external mirror 383 reflects an one-pass-amplified laser beam 427 back into the wedged laser active slab 403 through the entrance/exit window 423 at a slightly different angle from emergence so that the one-pass-amplified laser beam 427 makes the second zig-zag pass 419 through the through the gain sheet 405 of the wedged laser active slab 403. The external mirror 383 may be adjusted so that the two-pass-amplified laser beam 407 emerges at the exit window 425. The optional lens 385 may be a cylinder or spherical lens, and may be utilized to maintain mode matching for the second zig-zag pass 419.

Figure 26:
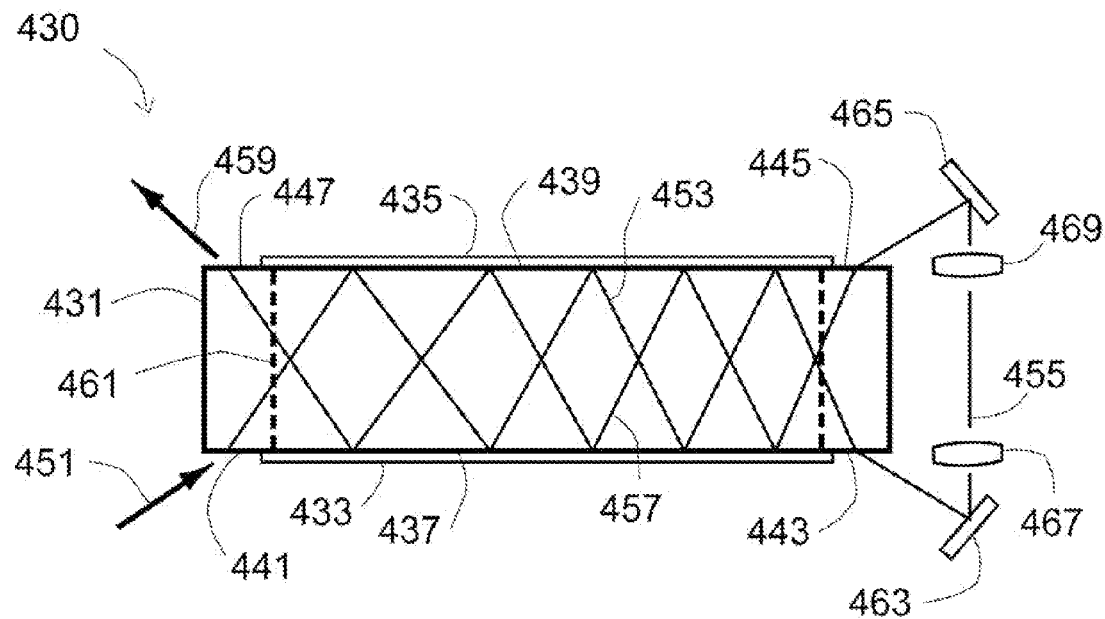
FIG. 26 is a diagrammatical illustration of another alternative embodiment of the two-pass laser amplifier of FIG. 24.

In still another embodiment, shown in FIG. 26, a two-pass laser amplifier 430 includes a wedged laser active slab 431 having optical coatings 433 and 435, highly reflecting at laser wavelength and highly transmitting at pump power wavelength, disposed on a portion of a first lateral face 437 and on a portion of a second lateral face 439, respectively. A first window 441 and a second window 443 are provided on the first lateral face 437, and a third window 445 and a fourth window 447 are provided on the second lateral face 439 as shown. An input laser beam 451 enters the wedged laser active slab 431 at the first window 441, makes a first zig-zag pass 453 within a gain sheet 461, exits at the second window 443 to follow an external path 455, enters at the fourth window 445 to make a second zig-zag pass 457, and exits at the third window 447 as a two-pass-amplified laser beam 459. The gain sheet 461 may be produced by one or more diode pump sources (not shown), as described above. A first external mirror 463 and a second external mirror 465 are highly reflecting at the lasing wavelength and serve to direct lasing radiation into the wedged laser active slab 431 for the second zig-zag pass 457. Optional lenses 467 and 469, which can be cylindrical or spherical lenses, may be provided to maintain proper mode matching within the wedged laser active slab 431.

Figure 27:
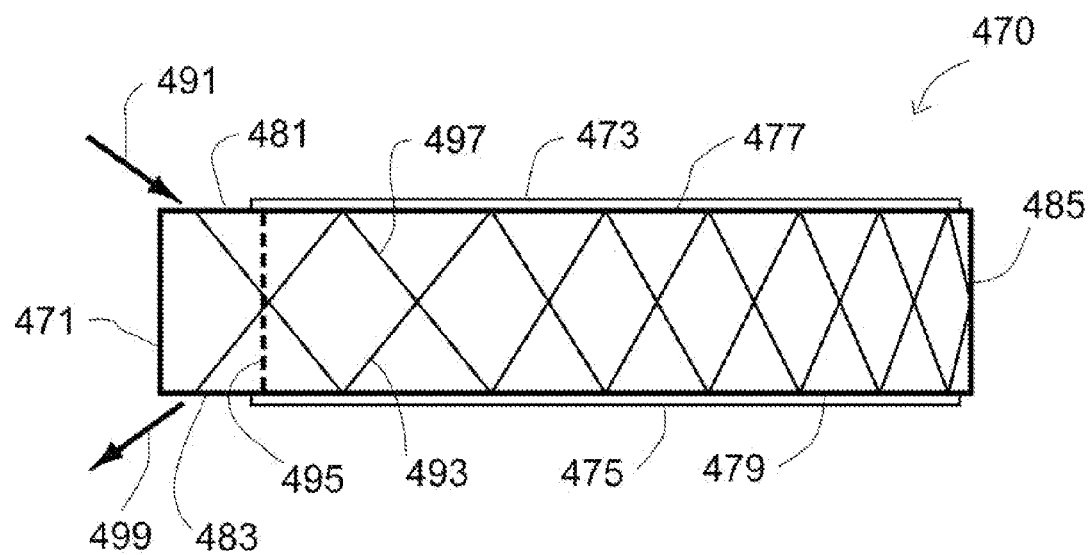
FIG. 27 is a diagrammatical illustration of yet another alternative embodiment of the two-pass laser amplifier of FIG. 24.

In yet another embodiment, shown in FIG. 27, a two-pass laser amplifier 470 is configured such that an external mirror is not required. The two-pass laser amplifier 470 includes a laser active slab 471 having optical coatings 473 and 475, highly reflecting at a wavelength of an input laser beam 491 and highly transmitting at pump power wavelength, disposed on a portion of a first lateral face 477 and on a portion of a second lateral face 479, respectively. A first window 481 is provided on the first lateral face 477, and a second window 483 is provided on the second lateral face 479 as shown. The input laser beam 491 enters the laser active slab 471 at the first window 481, which may be anti-reflection coated at the wavelength of the input laser beam 491, makes a first zig-zag pass 493 within a gain sheet 495 produced by one or more diode pump sources (not shown), reflects from a longitudinal face 485 by means of total internal reflection, makes a second zig-zag pass 497, and exits at the second window 483 as a two-pass-amplified laser beam 499. The longitudinal face 485 is oriented perpendicularly to a plane defined by the gain sheet 495 so that a one-pass-amplified laser beam (not shown) completing the first zig-zag pass though the gain sheet 495 remains in the gain sheet 495 after reflecting from the longitudinal face 485.

Figure 28:
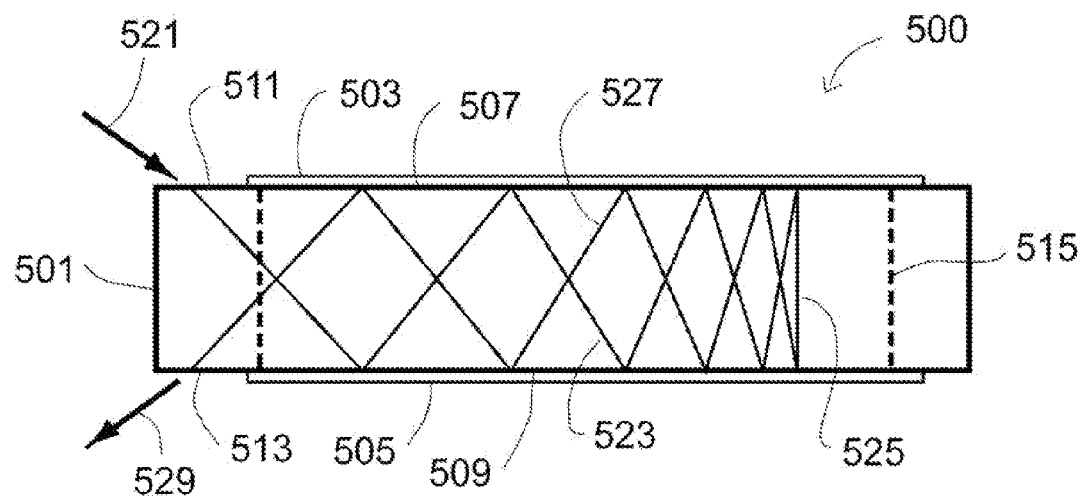
FIG. 28 is a diagrammatical illustration of still another alternative embodiment of the two-pass laser amplifier of FIG. 24.

In an alternative embodiment, shown in FIG. 28, a two-pass laser amplifier 500 is also configured without external mirrors. The two-pass laser amplifier 500 includes a wedged laser active slab 501 with optical coatings 503 and 505, highly transmitting at pump power wavelength and highly reflecting at lasing wavelength, disposed on respective portions of a first lateral face 507 and a second lateral face 509, respectively. A first window 511 is provided on the first lateral face 507, and a second window 513 is provided on the second lateral face 509 as shown, where the windows 511 and 513 may be anti-reflection coated at the lasing wavelength. An input laser beam 521 is directed into the wedged laser active slab 501 at a specified angle of incidence to the first window 511, and is propagated toward the narrower end of the wedged laser active slab 501 making a first zig-zag pass 523 within a gain sheet 515 produced by one or more diode pump sources (not shown).

The dihedral wedge angle formed by the first lateral face 507 and the second lateral face 509, provides for each successive reflection between the first lateral face 507 and the second lateral face 509 to be shorter and occur at a smaller angle of incidence than a previous reflection until the direction of propagation is reversed, at a shortest path leg 525 of the first zig-zag pass 523. The input laser beam 521 may subsequently make a second zig-zag pass 527 in the direction opposite to the first zig-zag pass 523 and may produce a two-pass-amplified laser beam 529 at the second window 513. Depending on the angle of incidence of the input laser beam 521, the second zig-zag pass 527 can be configured to exit the wedged laser active slab 501 at the second window 513, as shown, or at the first window 511 at a different angle (not shown) from the input laser beam 521. The distance from a first longitudinal face 517 to the shortest path leg 525, that is the distance into the wedged laser active slab 501 at which the first zig-zag path 523 reverses direction, may be determined by various parameters, including: the angle of incidence of the input laser beam 521, the magnitude of the dihedral wedge angle formed by the first lateral face 507 and the second lateral face 509, and the width of the wedged laser active slab 501, that is, the distance between the first lateral face 507 and the second lateral face 509. The desired configuration and operating parameters can thus be determined by one of ordinary skill in the art. Preferably, the shortest path leg 525 is located sufficiently close to a second longitudinal face 519 that good spatial overlap is realized for the first zig-zag pass 523 and for the second zig-zag pass 525, with the gain sheet 515.

Figure 29:
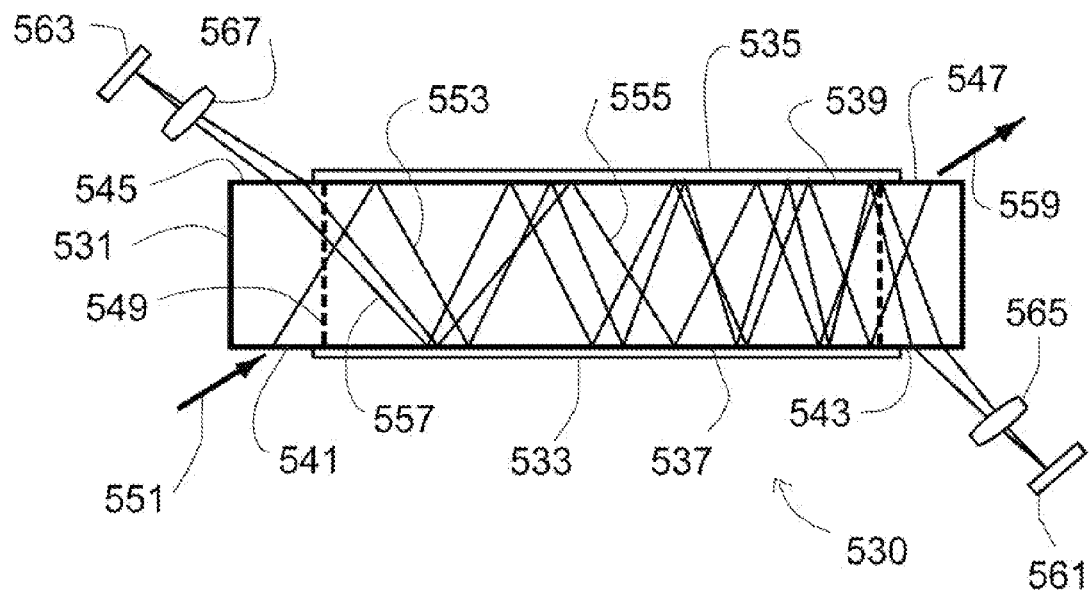
FIG. 29 is a diagrammatical illustration of an embodiment of a three-pass laser amplifier, in accordance with the present invention.

The number of passes realized in a laser amplifier having a wedged laser active slab is not limited to one or two, as can be explained with reference to a three-pass laser amplifier 530, shown in FIG. 29, and a four-pass laser amplifier 570, shown in FIG. 30. In FIG. 29, the three-pass laser amplifier 530 includes a wedged laser active slab 531 with optical coatings 533 and 535, highly transmitting at pump power wavelength and highly reflecting at lasing wavelength, disposed on respective portions of a first lateral face 537 and a second lateral face 539, respectively. A first window 541 and a second window 543 are provided on the first lateral face 537, and a third window 545 and a fourth window 547 are provided on the second lateral face 539 as shown. An input laser beam 551 is directed into the wedged laser active slab 531 at a specified angle of incidence to the first window 541 to make a first zig-zag pass 553 within a gain sheet 549 produced by one or more diode pump sources (not shown).

A first external minor 561, highly reflecting at the lasing wavelength, reflects a one-pass-amplified laser beam 553a from the first zig-zag pass 553 back into the wedged laser active slab 531 through the second window 543, but at a slightly different angle from emergence, so that a second zig-zag pass 555 is made through the gain sheet 549. Preferably, the first external mirror 561 is adjusted so that the second zig-zag pass 555 is incident upon the third window 545. A second external mirror 563, also highly reflecting at the lasing wavelength, reflects a two-pass-amplified laser beam 555a from the second zig-zag pass 555 back through the third window 545 so that a third zig-zag pass 557 can be made through the gain sheet 549. By adjusting the second external mirror 563, the third zig-zag pass 557 can be made incident on the fourth window 547, as shown, or can alternatively be made incident on the second window 543 (not shown). Optional lenses 565 and 567 may be cylindrical or spherical lenses, depending on the size of the input laser beam 551, and may be needed to maintain mode matching for the second zig-zag pass 555 and for the third zig-zag pass 557.

Figure 30:
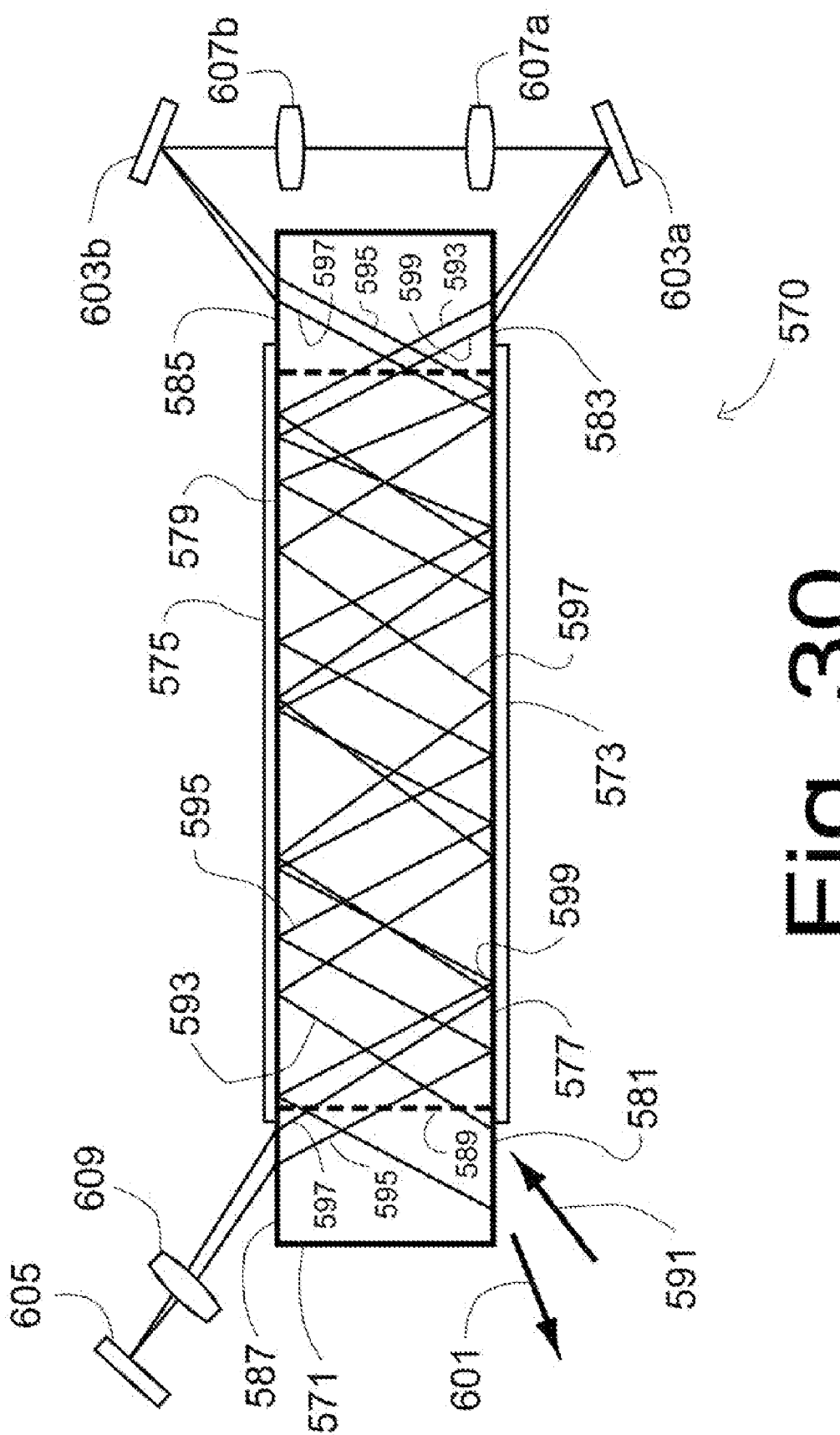
FIG. 30 is a diagrammatical illustration of an embodiment of a four-pass laser amplifier, in accordance with the present invention.

The four-pass laser amplifier 570, shown in FIG. 30, includes a wedged laser active slab 571 with optical coatings 573 and 575, highly transmitting at pump power wavelength and highly reflecting at a wavelength of an input laser beam 579, disposed on respective portions of a first lateral face 577 and a second lateral face 579, respectively. This configuration provides for a first window 581 and a second window 583 on the first lateral face 577, and for a third window 585 and a fourth window 587 provided on the second lateral face 579 as shown. The windows 581, 583, 585, and 587 may be anti-reflection coated at a wavelength of the input laser beam 591. The input laser beam 591 is directed into the wedged laser active slab 571 at a specified angle of incidence to the first window 581 to make a first zig-zag pass 593 within a gain sheet 589 produced by one or more diode pump sources (not shown).

A first external mirror 603a, highly reflecting at the lasing wave reflects a one-pass-amplified laser beam 593a from the first zig-zag pass 593 to a second external minor 603b and back into the wedged laser active slab 571 through the third window 585, so that a second zig-zag pass 595 is made through the gain sheet 589. Preferably, the first and second external mirrors 603a and 603b are adjusted so that the second zig-zag pass 595 terminates at the fourth window 587. A third external mirror 605, also highly reflecting at the lasing wavelength, reflects a two-pass-amplified laser beam 595a from the second zig-zag pass 595 back through the third window 587, but at a slightly different angle from emergence, so that a third zig-zag pass 597 is made through the gain sheet 589. By suitable adjustment, the third external mirror 605 can direct the terminus of the third zig-zag pass 597 onto the third window 585, as shown.

The second external mirror 603b and the first external mirror 603a reflect a three-pass-amplified laser beam 597a from the third zig-zag pass 597 back into the wedged laser active slab 571 through the second window 583, so that a fourth zig-zag pass 599 is made through the gain sheet 589 and a four-pass-amplified laser beam 601 is output from the first window 581. Preferably, the first and second external mirrors 603a and 603b are adjusted so that the terminus of the fourth zig-zag pass 599 terminates at the first window 581. Optional lenses 607a and 607b may be cylindrical or spherical lenses, depending on the size of the input laser beam 591, and may be needed to maintain mode matching for the second zig-zag pass 595 and for the fourth zig-zag pass 599. Optional lens 609 may be a cylindrical or a spherical lens and may be needed to maintain mode matching for the third zig-zag pass 597.

It can be appreciated by one skilled in the relevant art that any of the above one-pass or multi-pass laser amplifier embodiments may include one or more bulk Bragg gratings, also referred to in the relevant art as volume Bragg grating micro-optics or 3-D Bragg gratings. The volume Bragg grating serves to narrow the spectral bandwidth of emission from high-power diode lasers and diode laser bars, such as the sources of pump power described above, and the volume Bragg grating further stabilizes the peak diode laser emission wavelength as a function of temperature, and may advantageously reduce laser system cooling requirements.

Figure 31:
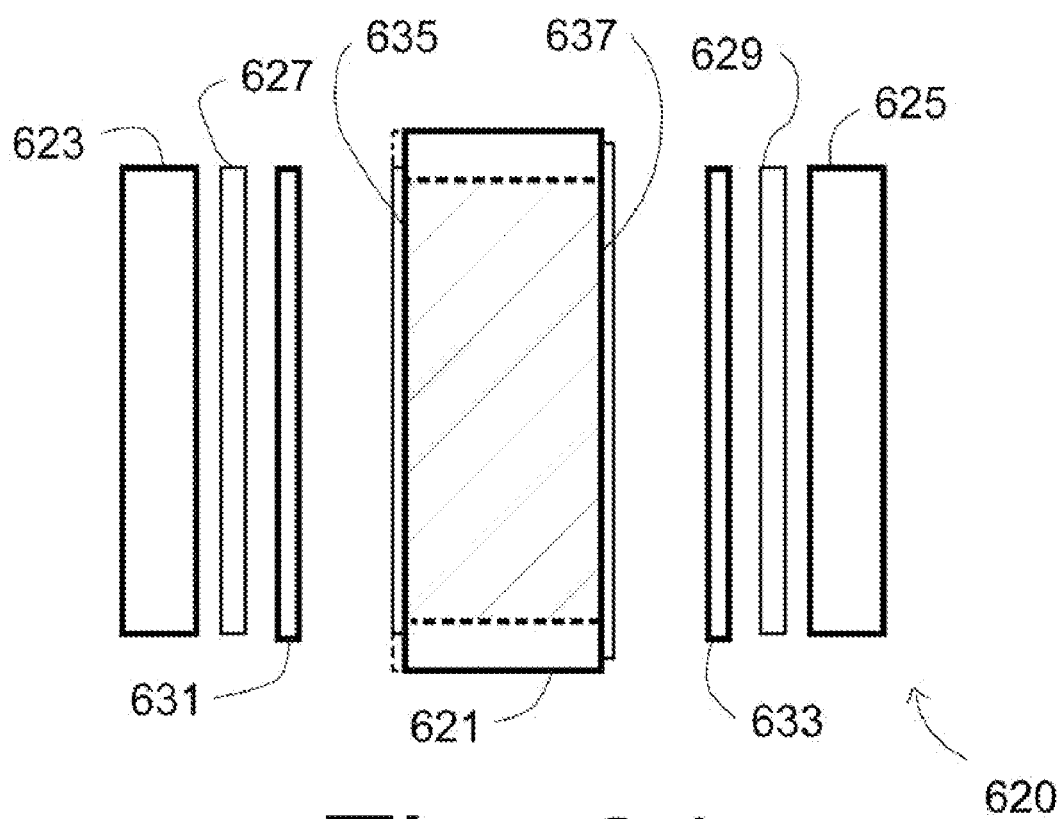
FIG. 31 is a diagrammatical illustration of an embodiment of a laser amplifier including volume Bragg gratings, in accordance with the present invention.

A laser amplifier 620, shown in FIG. 31, includes a laser active slab 621, such as any one of the laser active slabs 11, 81, 111, 151, 181, 201, 221, 251, 261, 331, 361, 371, 403, 431, 471, 501, 531, or 571 comprising laser active material as described above. In the configuration shown, the laser amplifier 620 includes a first diode bar 623 with a first microlens 627, and an optional second diode bar 625 with an optional second microlens 629. A first volume Bragg grating 631 may be disposed between the first microlens 627 and a first lateral side 635 of the laser active slab 621, and an optional second volume Bragg grating 633 may be disposed between the second microlens 629 and a second lateral side 637 of the laser active slab 621 as shown. Volume Bragg gratings may be commercially available from Ondax, Inc. of Monrovia, Calif. and from PD-LD, Inc. of Pennington, N.J., for example.

Figure 32:
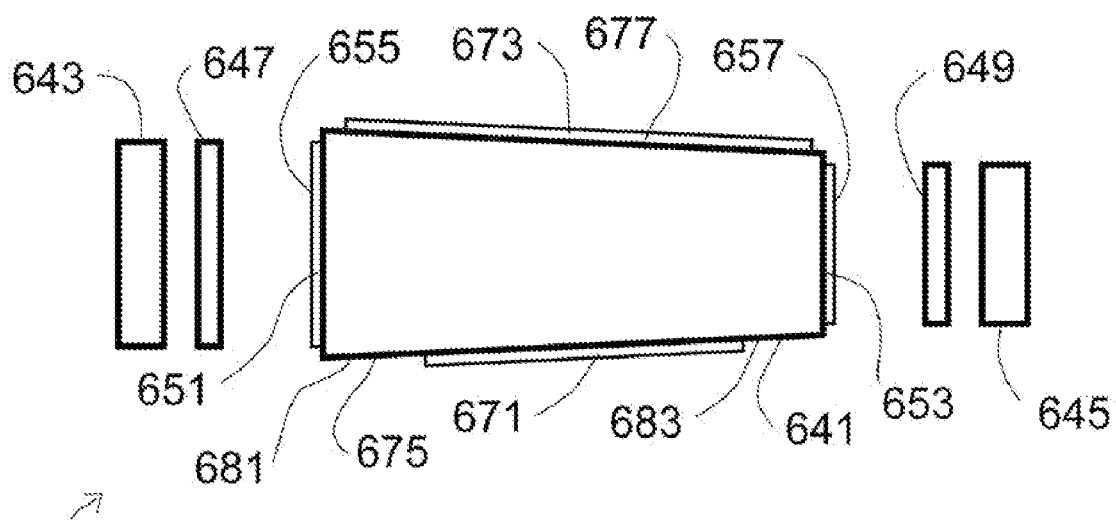
FIG. 32 is a diagrammatical illustration of an embodiment of a laser amplifier pumped through longitudinal faces, in accordance with the present invention.

In an alternative embodiment, shown in FIG. 32, a laser amplifier 640 includes a laser active slab 641 pumped from longitudinal faces rather than from lateral faces as described above. The dihedral wedge angle of the laser active slab 641 has been exaggerated for clarity of illustration. The laser amplifier 640 may include a first diode bar 643 with a first microlens 647 disposed adjacent a first longitudinal face 651, and an optional second diode bar 645 with a second microlens 649 disposed adjacent a second longitudinal face 653 as shown. A first longitudinal optical coating 655 may be disposed on the first longitudinal face 651 and a second longitudinal optical coating 657 may be disposed on the second longitudinal face 653.

The longitudinal optical coatings 655 and 657 are highly transmitting to the wavelength of pump power in the diode bars 643 and 645. A first lateral optical coating 671 may be disposed on a first lateral face 675 and a second lateral optical coating 673 may be disposed on a second lateral face 677, where the lateral optical coatings 671 and 673 are highly reflecting to the wavelength of lasing radiation. In the single-pass configuration shown, a first window 681 is provided for an incoming laser beam (not shown), and a second window 683 is provided for an emitted amplified laser beam (not shown). It should be understood that, in an alternate configuration, an exit window (not shown) may be provided on the second lateral face 677.

Figure 33:
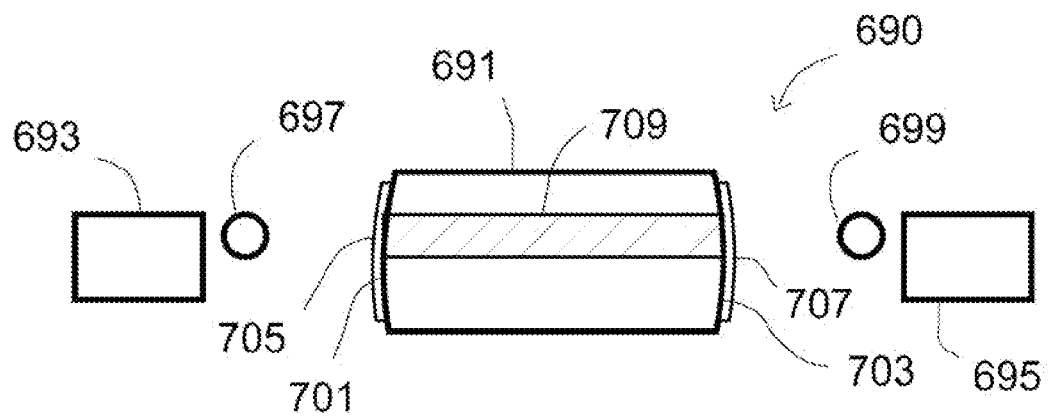
FIG. 33 is a diagrammatical illustration of an embodiment of a laser amplifier having convex lateral faces, in accordance with the present invention.

In still another embodiment, shown in FIG. 33, a laser amplifier 690 includes a laser active slab 691, a first diode bar 693 with a first microlens 697 and an optional second diode bar 695 with a second microlens 699. The first diode bar 693 and the optional second diode bar 695 may be used to produce a gain sheet 709 in the laser active slab 691. The laser active slab 691 includes a first convex lateral side 701 with a first optical coating 705, and a second convex lateral side 703 with a second optical coating 707. The optical coatings 705 and 707 are highly transmitting at the wavelength of the pump radiation produced by the diode bars 693 and 695 and are highly reflecting at lasing wavelength.

Figure 34:
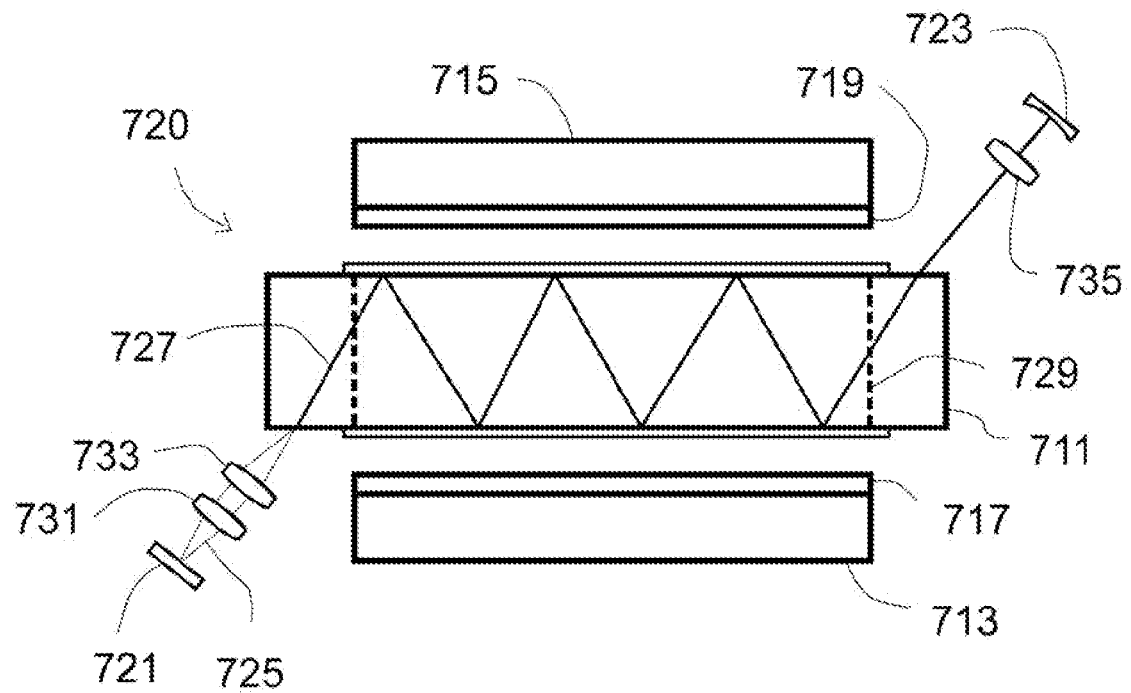
FIG. 34 is a diagrammatical illustration of a setup for the configuration of a laser oscillator, in accordance with the present invention.

In another application of the present invention, shown in FIG. 34, a laser oscillator configuration system 710 includes a laser active slab 711, a first diode bar 713 with a first microlens 717 and a second diode bar 715 with a second microlens 719. A first mirror 721 comprises an output coupler mirror that is partially transmitting at the laser wavelength. A second mirror 723 is highly reflecting at the laser wavelength. The mirrors 721 and 723 form a laser cavity 720 with the diode-pumped laser active slab 711. The mirrors 721 and 723 are aligned such that a resonator axis 725 follows a zig-zag path 727 within the laser active slab 711. The zig-zag path 727 may originate at a first window 737 and terminate at a second window 739, where the windows 737 and 739 are highly transmitting to a lasing wavelength. In an alternative embodiment (not shown) the second window 739 may be located on the same lateral face of the laser active slab 711. The laser cavity 720 may also be known as a linear or standing-wave resonator or oscillator in the relevant art. Optional lenses 731, 733, and 735 may be spherical lenses and/or cylinder lenses, and may be required to achieve proper mode matching of the laser resonator mode to a gain sheet 729 in the diode pumped laser active slab 711. Additional intra-cavity elements (not shown) may be included in the laser cavity 720 to achieve Q-switched or mode-locked operation of the oscillator, and/or to perform intra-cavity nonlinear optical wavelength conversion, as is well known in the art.

Figure 35:
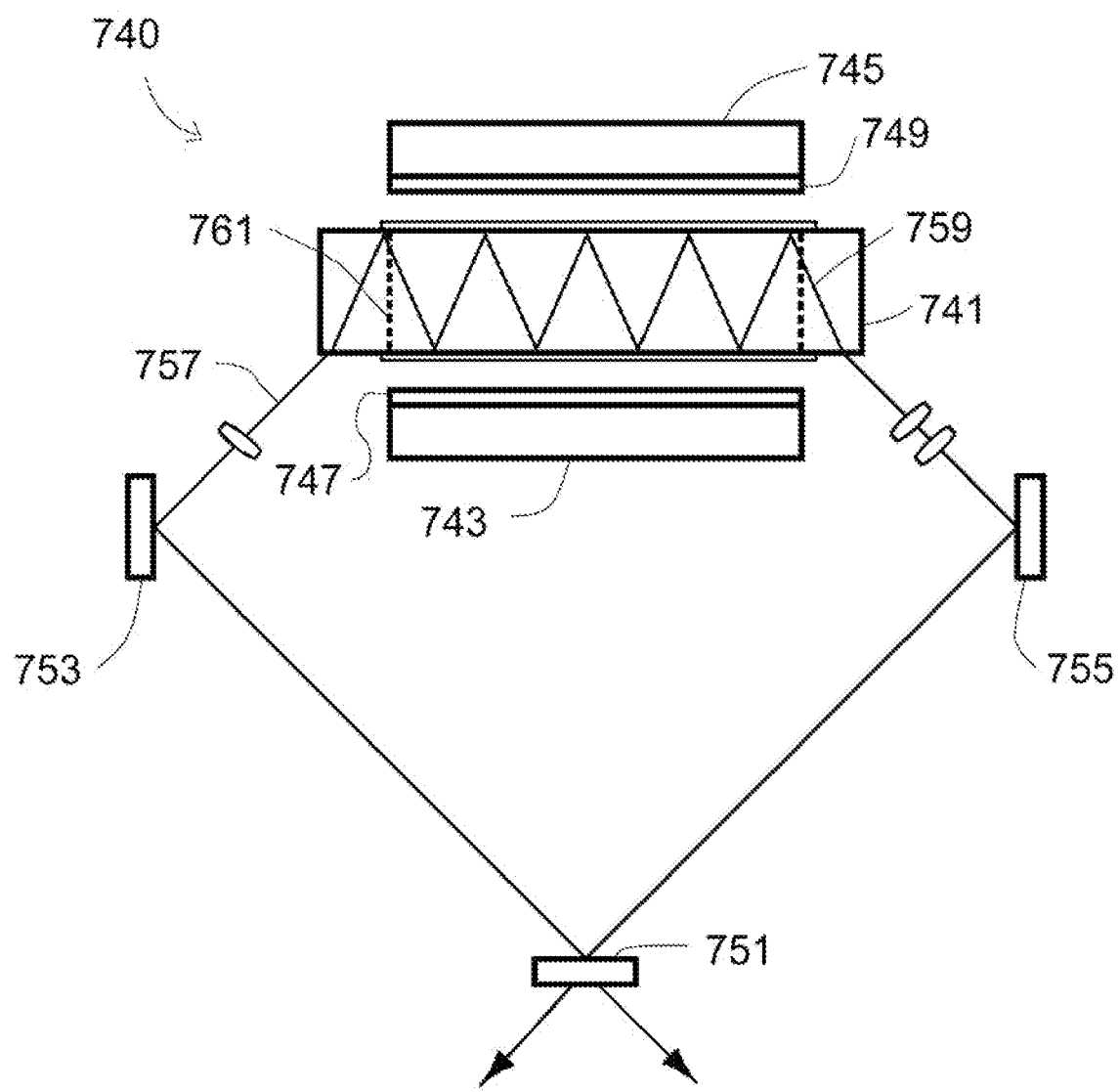
FIG. 35 is a diagrammatical illustration of a ring laser oscillator, in accordance with the present invention.

In still another application of the present invention, shown in FIG. 35, a laser oscillator configuration system 740 includes a laser active slab 741, a first diode bar 743 with a first microlens 747 and a second diode bar 745 with a second microlens 749. A first mirror 751, a second mirror 753, and a third mirror 755 are positioned and aligned as shown with respect to the laser active slab 741 so as to form a laser cavity having a resonator axis 757 that follows a zig-zag path 759 within the laser active slab 741. The first mirror 751 comprises an output coupler mirror that is partially transmitting at the lasing wavelength. The mirrors 753 and 755 are highly reflecting at the lasing wavelength.

The configuration formed is typically referred to in the relevant art as a "ring" resonator or a ring oscillator. The optional lenses 751, 753, and 755 may be spherical lenses and/or cylinder lenses, and may be required to achieve proper mode matching of the laser resonator mode to a gain sheet 761 in the diode-pumped laser active slab 741. Additional intra-cavity elements (not shown) may be included in the ring laser oscillator configuration system 740 to achieve Q-switched or mode-locked, to force unidirectional ring laser operation, and/or to perform intra-cavity nonlinear optical wavelength conversion, as is well known in the art.

Figure 36:
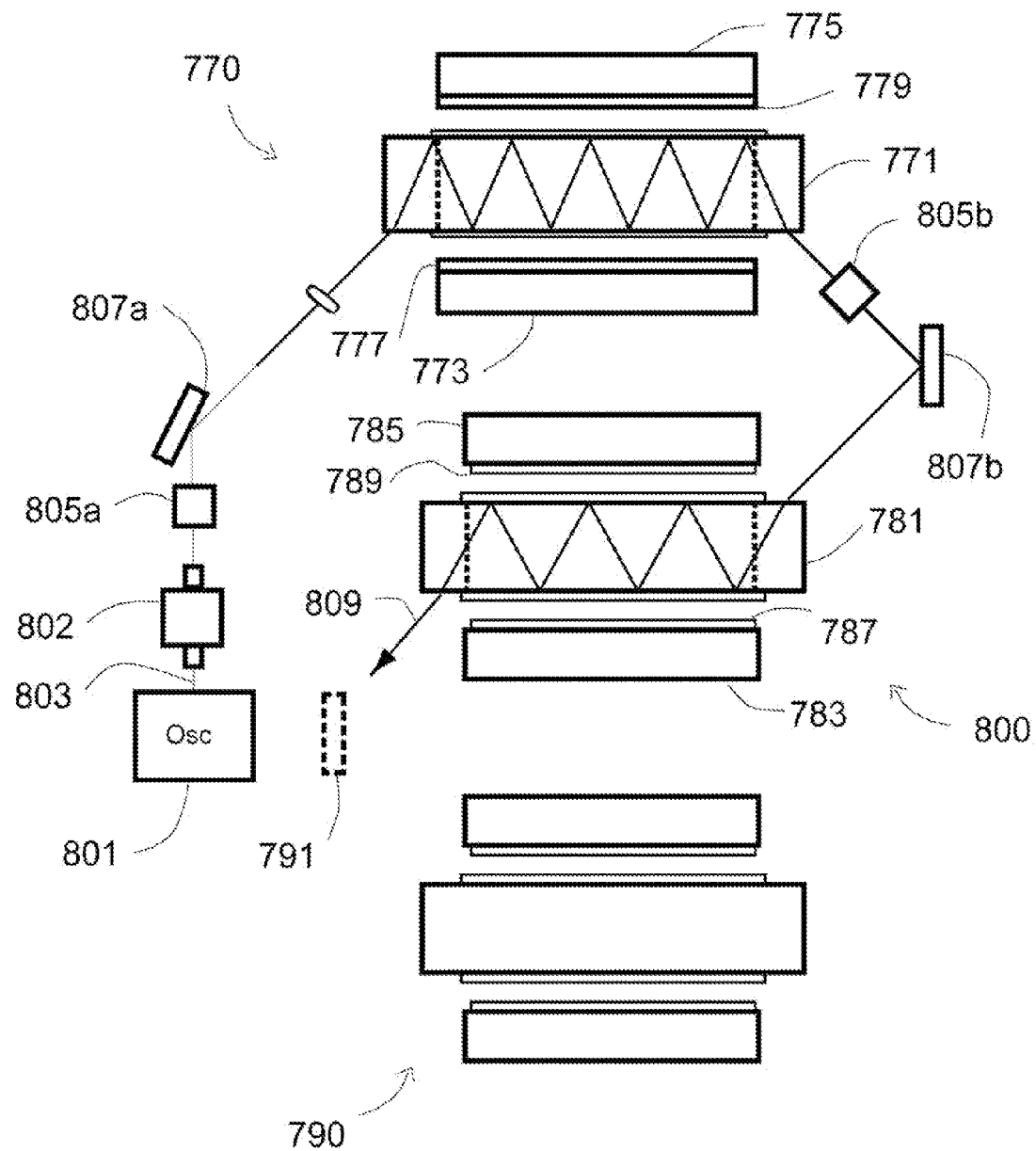
FIG. 36 is a diagrammatical illustration of a cascaded laser amplifier chain, in accordance with the present invention.

In yet another application of the present invention, shown in FIG. 36, an oscillator-amplifier "chain" 800 includes an oscillator 801, a first laser amplifier stage 770, and a second laser amplifier stage 780 producing an amplified laser beam 809. The oscillator 801 may comprise a standing-wave laser oscillator utilizing one or more of the diode-pumped laser active slabs 11, 81, 111, 151, 181, 201, 221, 251, 261, 331, 361, 371, 403, 431, 471, 501, 531, or 571 described above. In an alternative embodiment, the oscillator 801 may comprise a ring laser oscillator, such as disclosed in the ring laser oscillator configuration system 740 shown in FIG. 35.

Alternatively, the oscillator 801 can be of another oscillator design that emits a laser beam having a wavelength that is matched at the gain or lasing wavelength of the subsequent amplifier stages that incorporate one or more of the diode-pumped laser active slabs 11, 81, 111, 151, 181, 201, 221, 251, 261, 331, 361, 371, 403, 431, 471, 501, 531, or 571 described above. Such alternative laser oscillators may include, for example, a microchip laser, a fiber laser, or a semiconductor diode laser, including CW, Q-switched laser, gain-switched laser, and mode-locked versions of these lasers, but the present invention is not limited to the use of such laser oscillators.

The first laser amplifier stage 770 may include a laser active slab 771, a first diode bar 773 with a first microlens 777, and a second diode bar 773 with a second microlens 779. The second laser amplifier stage 780 may include a laser active slab 781, a first diode bar 783 with a first microlens 787, and a second diode bar 783 with a second microlens 789. The second laser amplifier stage 780 may be of the same type and configuration as the first laser amplifier stage 770.

An oscillator output beam 803 may pass through a first mode-matching component 805*a* before entering the first laser amplifier stage 770. The first mode-matching component 805*a* serves to adjust the oscillator beam size and shape in each laser amplifier stage to optimally extract power and/or energy from the respective laser amplifier stage. The first mode-matching component 805*a* may comprise an image relay lens, or a lens system, that performs one-to-one (i.e., 1:1) imaging from the laser active slab 771 to the laser active slab 781, for example.

The oscillator output beam 803 may be directed into the first laser amplifier stage 770 via a first mirror 807*a*, which is highly reflecting at the laser wavelength. The output beam 803 follows a zig-zag beam path in the first laser amplifier stage 770 and in the second laser amplifier stage 780. A second mode-matching component 805*b* may be provided between the first laser amplifier stage 770 and the second laser amplifier stage 780. It should be understood that, although the diagram shows single-pass configurations for the first laser amplifier stage 770 and the second laser amplifier stage 780, the invention is not so limited and the chain laser amplifier 800 may comprise one or more two-pass, three-pass, or four-pass laser amplifier configurations, as described in greater detail above. Alternatively, the laser amplifier chain 800 can be extended with one or more additional amplifier stages, such as a third amplifier stage 790, where the amplified laser beam 809 may be directed into the third amplifier stage 790 by a third mirror 791. In an alternative embodiment, the laser amplifier chain 800 may include a Faraday isolator 802, disposed in the optical path of the oscillator output beam 803, between the oscillator 801 and the first mode-matching component 805*a*.

Figure 37:
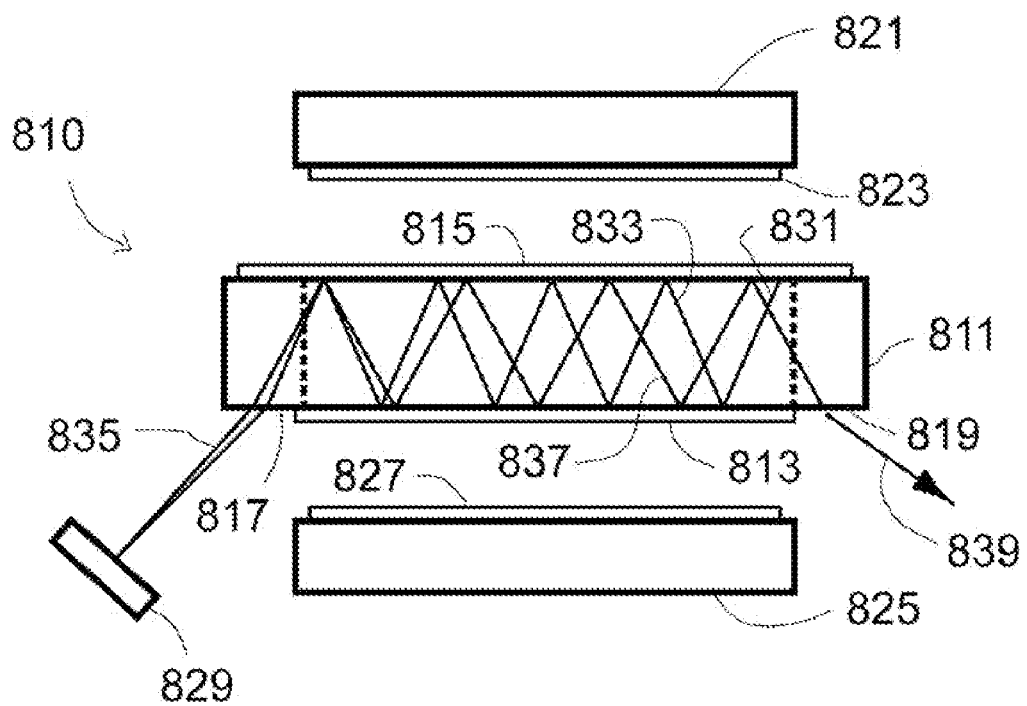
FIG. 37 is a diagrammatical illustration of an amplified spontaneous emission source, in accordance with the present invention.

In another alternative application of the present invention, shown in FIG. 37, an amplified spontaneous emission source 810 includes a wedged laser active slab 811, a first diode pump source 821 with a microlens 823, and a second diode pump source 825 with a microlens 827. The wedged laser active slab 811 may include optical coatings 813 and 815, highly transmitting at pump power wavelength and highly reflecting at lasing wavelength, with a first window 817 and a second window 819. A spontaneous emission 831 originating in the wedged laser active slab 811 makes a first zig-zag path 833 and exits at the first window 817 as amplified spontaneous emission radiation 835 incident on a mirror 829. The minor 829 is highly reflecting at the lasing wavelength of the active material contained in the wedged laser active slab 811, and serves to reflect the amplified spontaneous emission radiation 835 back into the wedged laser active slab 811 via the first window 817. The amplified spontaneous emission radiation 835 makes a second zig-zag path 837 through the wedged laser active slab 811 to emerge as an amplified spontaneous emission output beam 839.

In a preferred embodiment, the diode pump power is substantial enough, the lengths of the zig-zag passes 833 and 837 in the laser active slab 811 are long enough, and the diode-pumped gain-per-unit-length, $g_o$ is adequately high, such that the two zig-zag passes 833 and 837 alone are sufficient to extract power from the laser active slab 811 with good efficiency. Other amplified spontaneous emission source configurations are also possible in which the spontaneous emission makes three or four passes through the laser active slab, as described above, as might be appropriate when using lower-gain laser active materials in the amplified spontaneous emission source.

Figure 38:
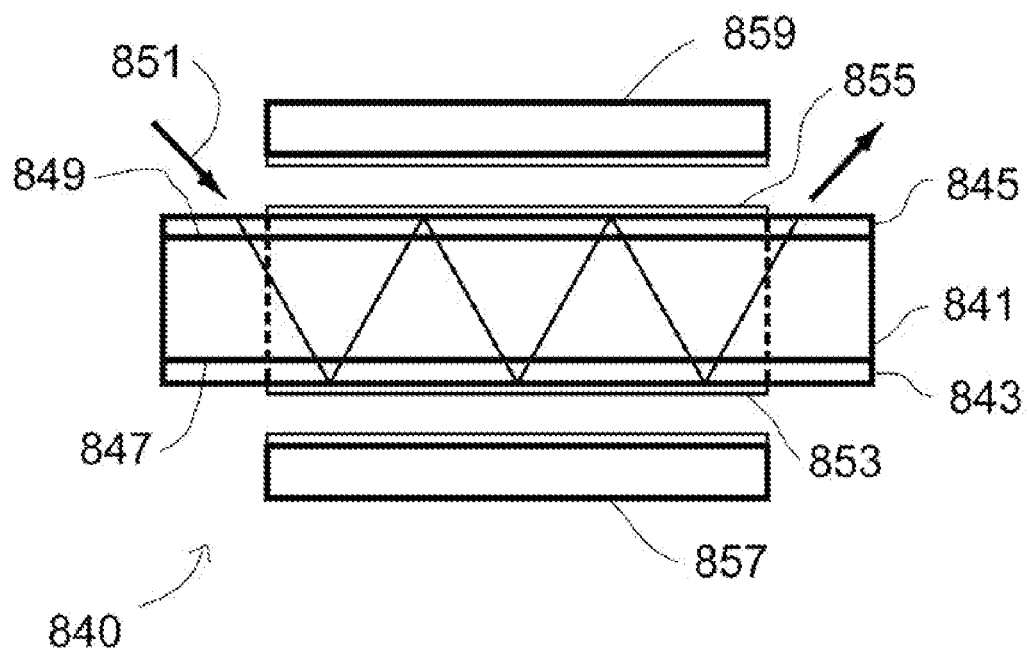
FIG. 38 is a diagrammatical illustration of a laser amplifier having a laser active slab with undoped lateral sections, in accordance with the present invention.

FIG. 38 is a diagrammatical illustration of a laser amplifier 840 having a laser active slab 841 with undoped lateral sections 843 and 845. The configuration of the laser active slab 841 may improve the quality of a laser beam 851 or resonator mode being amplified under operating conditions in which diode pump power from diode bars 857 and 859 is sufficiently high enough to produce thermo-mechanical distortion at lateral sides 847 and 849. The undoped lateral sections 843 and 845 comprise the same active material, or a similar host material, as the laser active slab 841 but do not include the laser active ions present in the laser active slab 841. As is well-known to someone of ordinary skill in the art, such use of an undoped material section bonded to a doped laser crystal (e.g., a slab or a rod) may serve to reduce thermo-mechanical distortion of a diode-pumped face, and thereby increases the pump power density limit at which thermal fracture of the diode-pumped face may occur. The undoped lateral sections 843 and 845 may include respective film coatings 853 and 855 highly transmitting at pump wavelength and highly reflecting at lasing wavelength. The undoped lateral sections 843 and 845 may be optically contacted and bonded to the laser active slab 841 using diffusion bonding techniques, or other epoxy less methods, as have become commercially available in recent years from suppliers such as VLOC Corporation of New Port Richey, Fla. and Onyx Optics of Dublin, Calif.

While the invention has been described with reference to particular embodiments, it will be understood that the present invention is by no means limited to the particular constructions and methods herein disclosed and/or shown in the drawings, but also comprises any modifications or equivalents within the scope of the claims.

The invention claimed is:

1. A method for obtaining an optimal wedge lateral dihedral angle for suppressing parasitic amplified spontaneous emission in a wedged slab of laser active material, said method comprising the steps of:
   providing a simulator slab of the laser active material
   providing first and second simulator mirrors highly reflective at a lasing wavelength;
   configuring a simulation laser amplifier by positioning said first and second simulator mirrors so as to enclose said simulator slab, and orienting said first and second simulator mirrors so as to form a mirror dihedral angle;
   generating a gain sheet in said simulator slab using a source of pump power;
   directing an input laser beam into said gain sheet such that said input laser beam follows a zigzag path between said first and second simulator mirrors and emerges from said simulator slab as an amplified laser beam;
   testing for the presence of parasitic amplified spontaneous emission in said simulation amplifier;
   if said step of testing indicates a parasitic amplified spontaneous emission, signal exceeding a predetermined level, repeatedly increasing said mirror dihedral angle and repeating said step of testing until an optimal mirror dihedral angle is determined, such that said parasitic amplified spontaneous emission signal is indicated to be at or below said predetermined level at said optimal mirror dihedral angle; and specifying said optimal mirror dihedral angle as the optimal wedge lateral, dihedral angle for suppressing parasitic amplified spontaneous emission in the wedged slab of laser active material.

2. A method as in claim 1 further comprising the steps of: if said parasitic amplified spontaneous emission signal does not exceed said predetermined level, repeatedly decreasing said mirror dihedral angle and repeating said step of testing until a parasitic amplified spontaneous emission signal exceeding said predetermined level is indicated, and identifying as said optimal wedge lateral dihedral angle the smallest mirror dihedral angle for which said parasitic amplified spontaneous emission signal is determined to be at or below said predetermined level.

3. A method as in claim 1 wherein said step of testing comprises the step of producing an input/output power curve showing amplified laser beam power as a function of pump power for said mirror dihedral angle, whereby the presence of parasitic amplified spontaneous emissions exceeding said predetermined level is indicated if said input/output power curve deviates from a linear curve by a pre-specified value and the presence of parasitic amplified spontaneous emission exceeding said predetermined level is not indicated if said input/output power curve does not deviate from said linear curve by said pre-specified value.

4. A method as in claim 1 wherein said step of testing comprises the step of removing said input laser beam and measuring for parasitic amplified spontaneous emission output from said simulator slab.

5. A method as in claim 1 wherein said simulator slab comprises parallel lateral sides, said simulator slab further having dimensions substantially the same as the wedged slab of laser active material.

\* \* \* \* \*